United States Patent
Trachewsky

(10) Patent No.: US 7,813,295 B2
(45) Date of Patent: Oct. 12, 2010

(54) CO-LOCATION INTERFERENCE AVOIDANCE IN MULTIPLE PROTOCOL COMMUNICATION NETWORKS

(75) Inventor: Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 424 days.

(21) Appl. No.: 11/651,784

(22) Filed: Jan. 10, 2007

(65) Prior Publication Data
US 2007/0109973 A1    May 17, 2007

Related U.S. Application Data

(60) Provisional application No. 60/855,856, filed on Nov. 1, 2006.

(51) Int. Cl.
*H04J 1/16* (2006.01)
(52) U.S. Cl. ................... 370/252; 370/329; 370/338
(58) Field of Classification Search .......... 370/310–350
See application file for complete search history.

(56) References Cited

U.S. PATENT DOCUMENTS

| 5,533,099 | A | * | 7/1996 | Byrne | 370/347 |
| 5,991,287 | A | * | 11/1999 | Diepstraten et al. | 370/338 |
| 6,167,237 | A | * | 12/2000 | Rapeli | 455/522 |
| 7,317,900 | B1 | * | 1/2008 | Linde et al. | 370/331 |
| 2003/0067935 | A1 | * | 4/2003 | Hosein | 370/437 |
| 2004/0242154 | A1 | * | 12/2004 | Takeda et al. | 455/16 |

OTHER PUBLICATIONS

Jari Jokela, et al; "Co-located Interference Diagnostics"; IEEE 802.11-06/0646r7; Nov. 2006 (14 pgs.).
Jari Jokela, Nokia; "IEEE P802.11 Wireless LANs-Interferene Diagnostics"; IEEE 802.11-06/0645r3; Nov. 2006; (13 pgs.).

* cited by examiner

*Primary Examiner*—Kent Chang
*Assistant Examiner*—Kashif Siddiqui
(74) *Attorney, Agent, or Firm*—Garlick Harrison & Markison

(57) ABSTRACT

A method includes an access point providing a request for co-location interference information to at least one multiple protocol device. The method continues with the at least one multiple protocol device obtaining co-location interference information in response to the request. The method continues with the at least one multiple protocol device providing the co-location interference information to the access point.

13 Claims, 14 Drawing Sheets

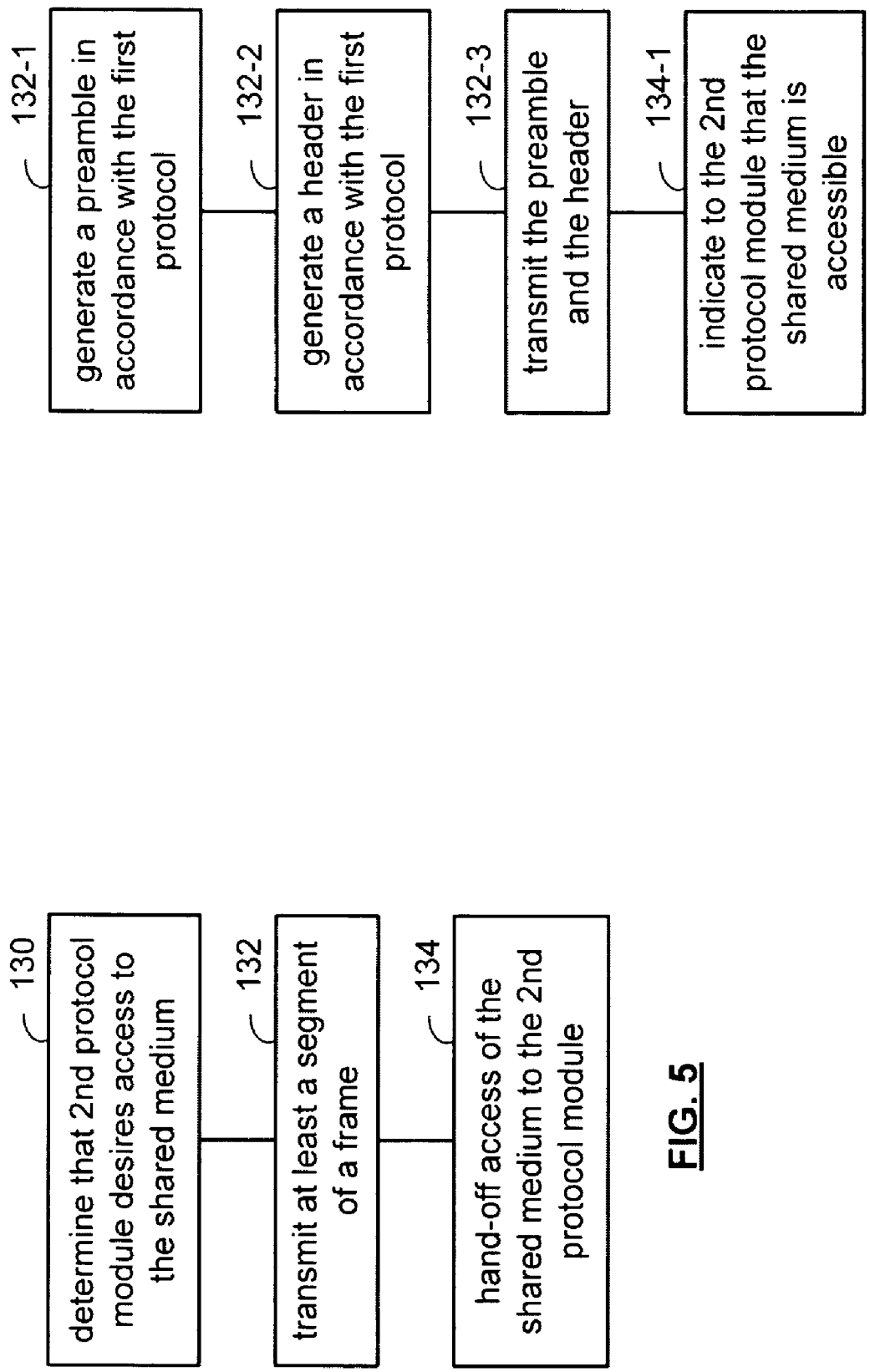

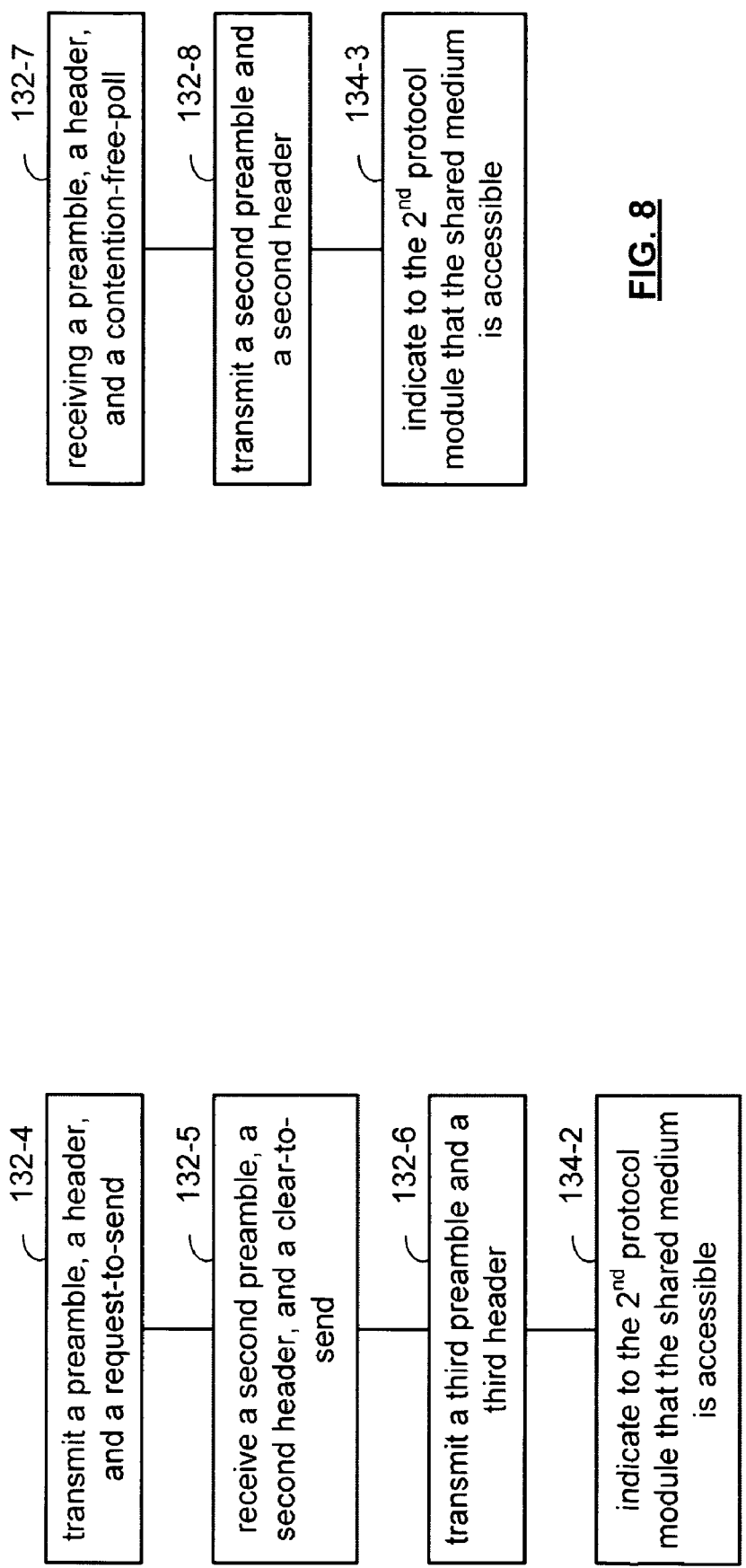

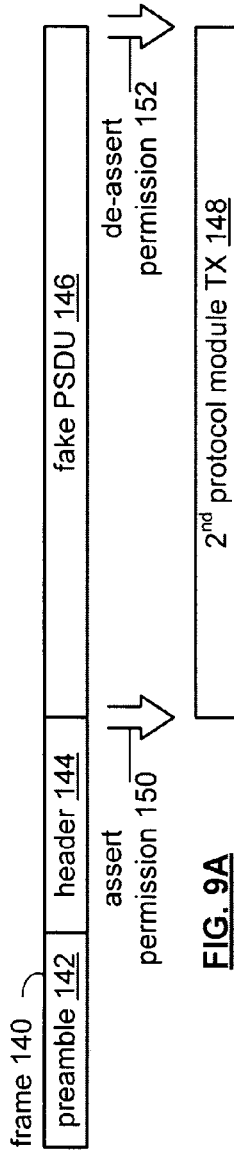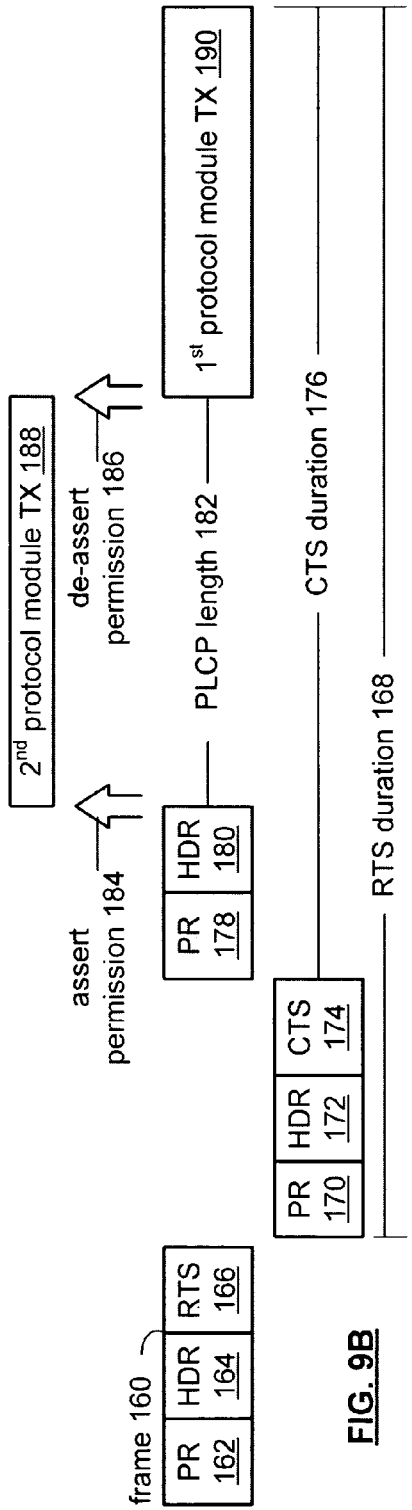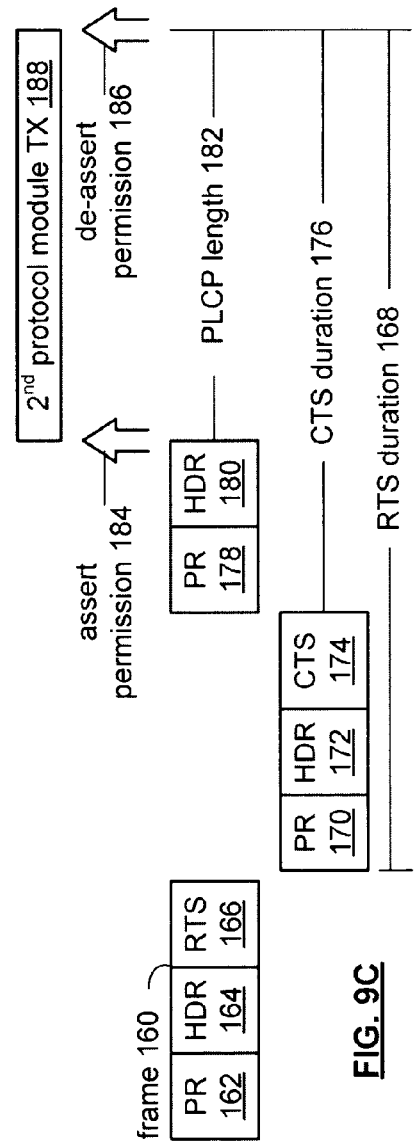
FIG. 9A
FIG. 9B
FIG. 9C

CO-LOCATION INTERFERENCE AVOIDANCE IN MULTIPLE PROTOCOL COMMUNICATION NETWORKS

This patent application is claiming priority under 35 USC §119 to a provisionally filed patent application entitled CO-LOCATION INTERFERENCE AVOIDANCE IN MULTIPLE PROTOCOL COMMUNICATION NETWORKS, having a provisional filing date of Nov. 1, 2006, and a provisional Ser. No. of 60/855,856, and is claiming priority under 35 USC §120 as a continuation in part of co-pending patent application entitled COLLISION AVOIDANCE IN MULTIPLE PROTOCOL COMMUNICATION NETWORKS USING A SHARED COMMUNICATION MEDIUM, having a filing date of Oct. 10, 2006, and a Ser. No. of 11/545,743; of COORDINATION OF MULTIPLE PROTOCOLS USING A SHARED COMMUNICATION MEDIUM having a filing date of Mar. 9, 2005 and a Ser. No. of 11/075,981; and of co-pending patent application entitled MULTIPLE NETWORK MULTIPLE PROTOCOL COMMUNICATION USING A SHARED COMMUNICATION MEDIUM, having a filing date of Jun. 26, 2006, and a Ser. No. of 11/475,634, which claims priority to a provisionally filed patent application having the same title, a provisional filing date of Jun. 29, 2005, and a provisional Ser. No. of 60/694,948.

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to obtaining co-location interference information to improve access to a shared medium by multiple protocols of one or more communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

For both wireless and wireline communication systems, there are many standards that provide protocols as to how audio, text, video, data, and/or any other type information is to be conveyed within the system. Communication devices that are designed to be compliant with a particular standard (e.g., Ethernet 10Base-T, IEEE 802.11b, Bluetooth) are able to communication with any other communication device within the communication system that is compliant with the same standard. For example, wireless communication devices that are compliant with IEEE 802.11b can communicate with each other, provided they are properly registered to the same communication system.

As is known, differing standards sometimes use the same communication medium (e.g., allocated radio frequency spectrum, wired connections, etc.) due to a finite amount of communication medium. For example, both Bluetooth and IEEE 802.11b use the 2.4 GHz spectrum. As long as communication systems that are compliant with differing standards that share a communication medium do not physically overlap, the systems operate without interference from each other. However, if the communication systems do physically overlap, they will interfere with each other, degrading the performance of both systems. For example, if a Bluetooth pico net physically overlaps with an IEEE 802.11b local area network, simultaneous use of the 2.4 GHz spectrum will cause interference that will most likely cause both transmissions to fail.

To help reduce this problem, communication devices have been developed to be compliant with multiple standards that have different protocols for a shared communication medium. For example, wireless communication devices have been developed that are compliant with both Bluetooth and IEEE 802.11(a), (b), and/or (g). In such devices, the Medium Access Control (MAC) layer of one protocol communicates with the MAC layer of another protocol to avoid simultaneous use of the shared communication medium.

While this substantially reduces simultaneous use of a shared communication medium on a device-by-device basis, it does little to reduce simultaneous use on a communication system level. For example, if a first communication device desires to use the shared communication medium in accordance with a first protocol, it will block its use of a second protocol for the duration of the use per the first protocol, however, a second communication device may concurrently desire to use the shared communication medium in accordance with the second protocol. Since the protocols are different, the first device will obtain access of the shared communication medium in accordance with the first protocol and the second device will obtain access of the shared communication medium in accordance with the second protocol. With both devices concurrently accessing the shared communication medium, their transmissions will interfere with each other, causing at least one of the transmissions to fail.

Therefore, a need exists for a method and apparatus for coordinating multiple protocols using a shared communication medium based on co-location interference information.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 5 is a logic diagram of a method for coordinating multiple protocols using a shared communication medium in accordance with the present invention;

FIGS. 6-8 are logic diagrams of various embodiments of transmitting a frame, or portion thereof, and handing-off access of the shared communication medium of the method of FIG. 5;

FIGS. 9A-9F are diagrams of various examples of coordinating multiple wireless protocols using a shared communication medium in accordance with the present invention;

DETAILED DESCRIPTION OF THE INVENTION

Figure 1:
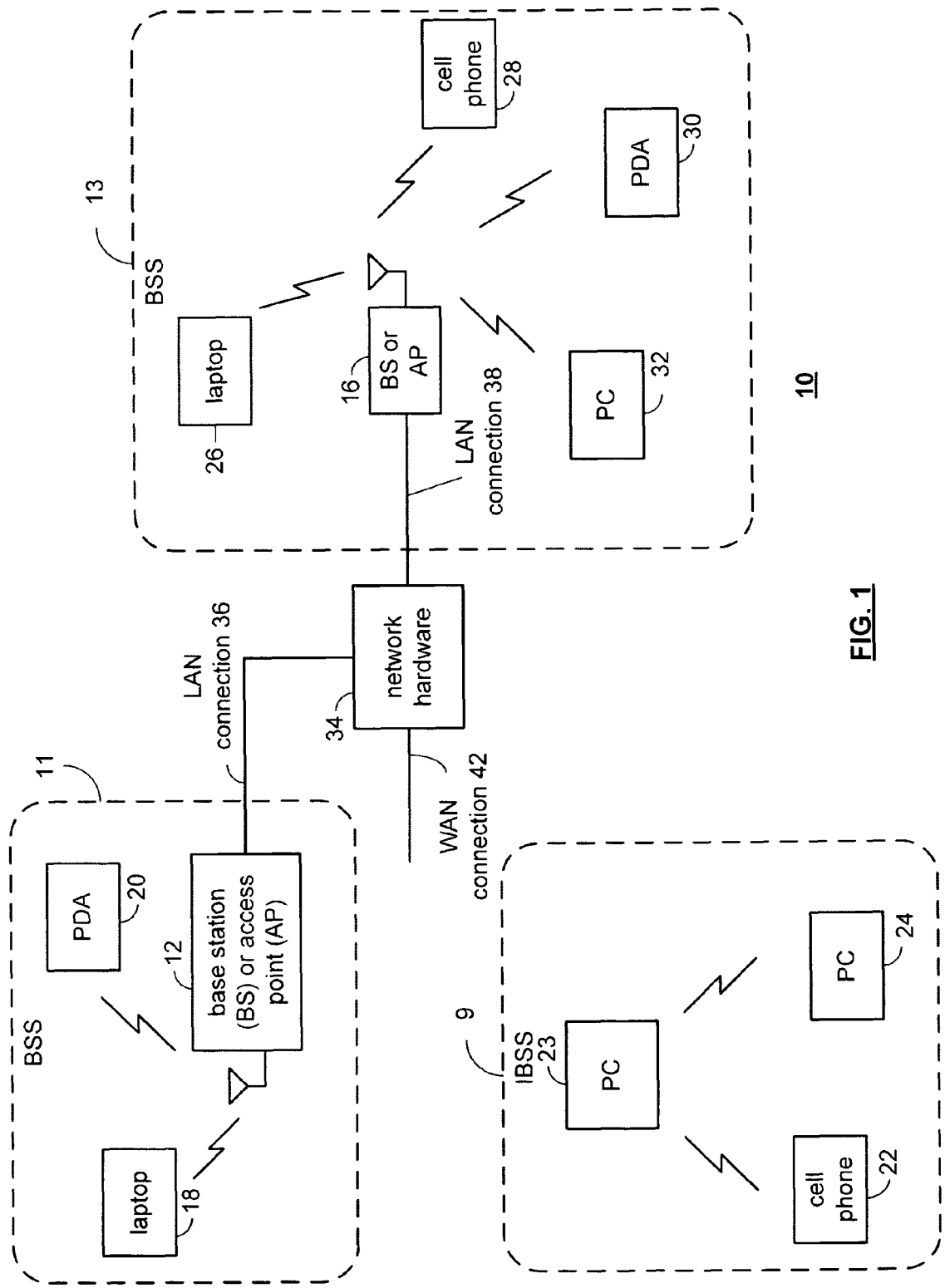
FIG. 1 is a schematic block diagram of a wireless communication system in accordance with the present invention.

FIG. 1 is a schematic block diagram of an example of a wireless communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 3 and 4.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
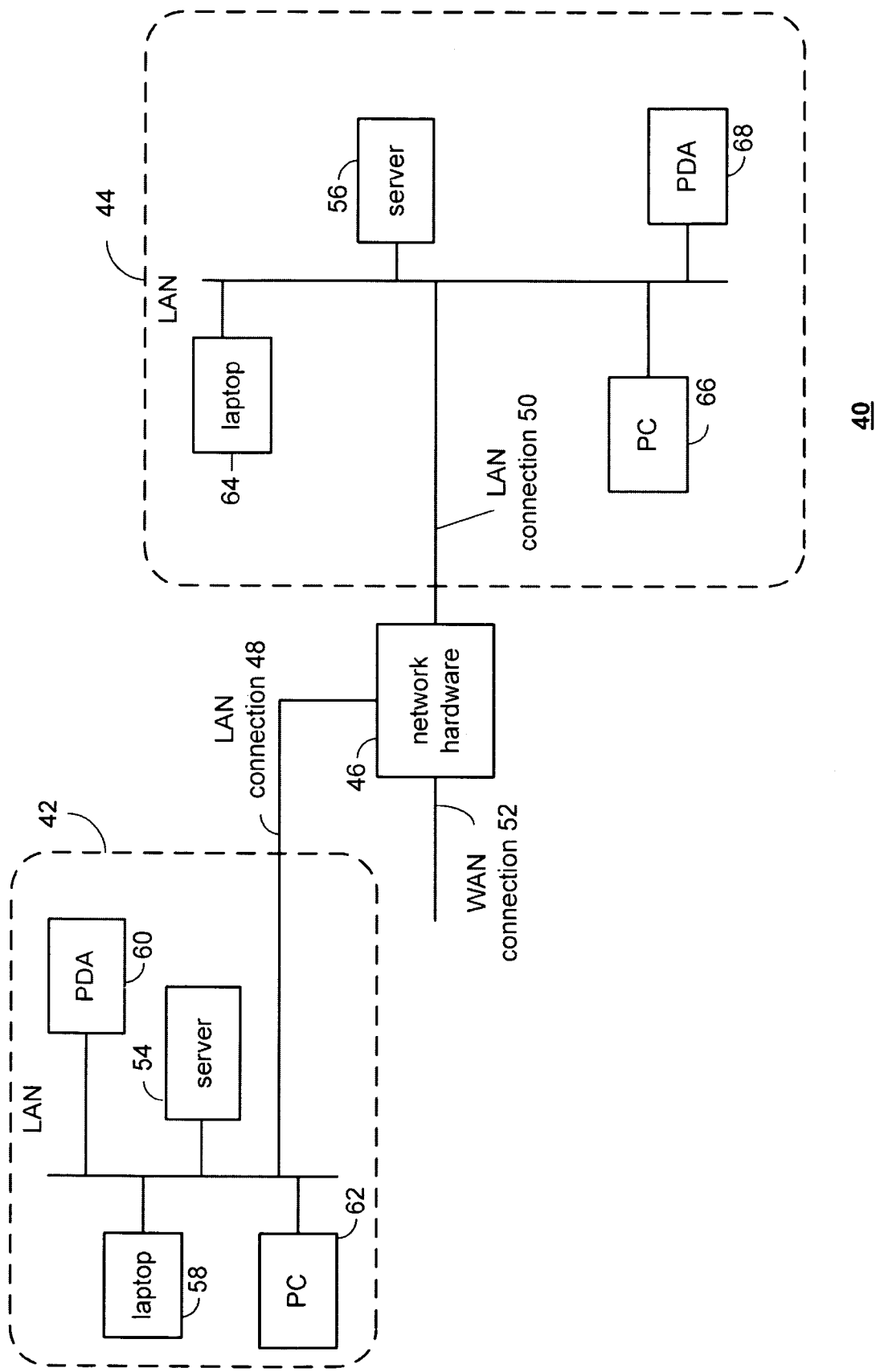
FIG. 2 is a schematic block diagram of a wireline communication system in accordance with the present invention.

FIG. 2 is a schematic block diagram of an example of a wireline communication system 40 that includes two local area networks (LAN) 42 and 44 and network hardware 46. Each of the LANs 42 and 44 includes a server 54, 56 and a plurality of communication devices 58-62 and 64-68, which are connected to the network hardware 46 via LAN connections 48 and 50. Note that the network hardware 46, which may be a router, switch, bridge, modem, system controller, et cetera provides a wide area network connection 52 for the communication system 40. Further note that the communication devices 58-62 and 64-68 each include a network card to communicate with the network hardware 46 and may be a laptop computer 58, 64, a personal digital assistant 60, 68, or a personal computer 62, 66. The details of the communication devices will be described in greater detail with reference to FIG. 3.

Figure 3:
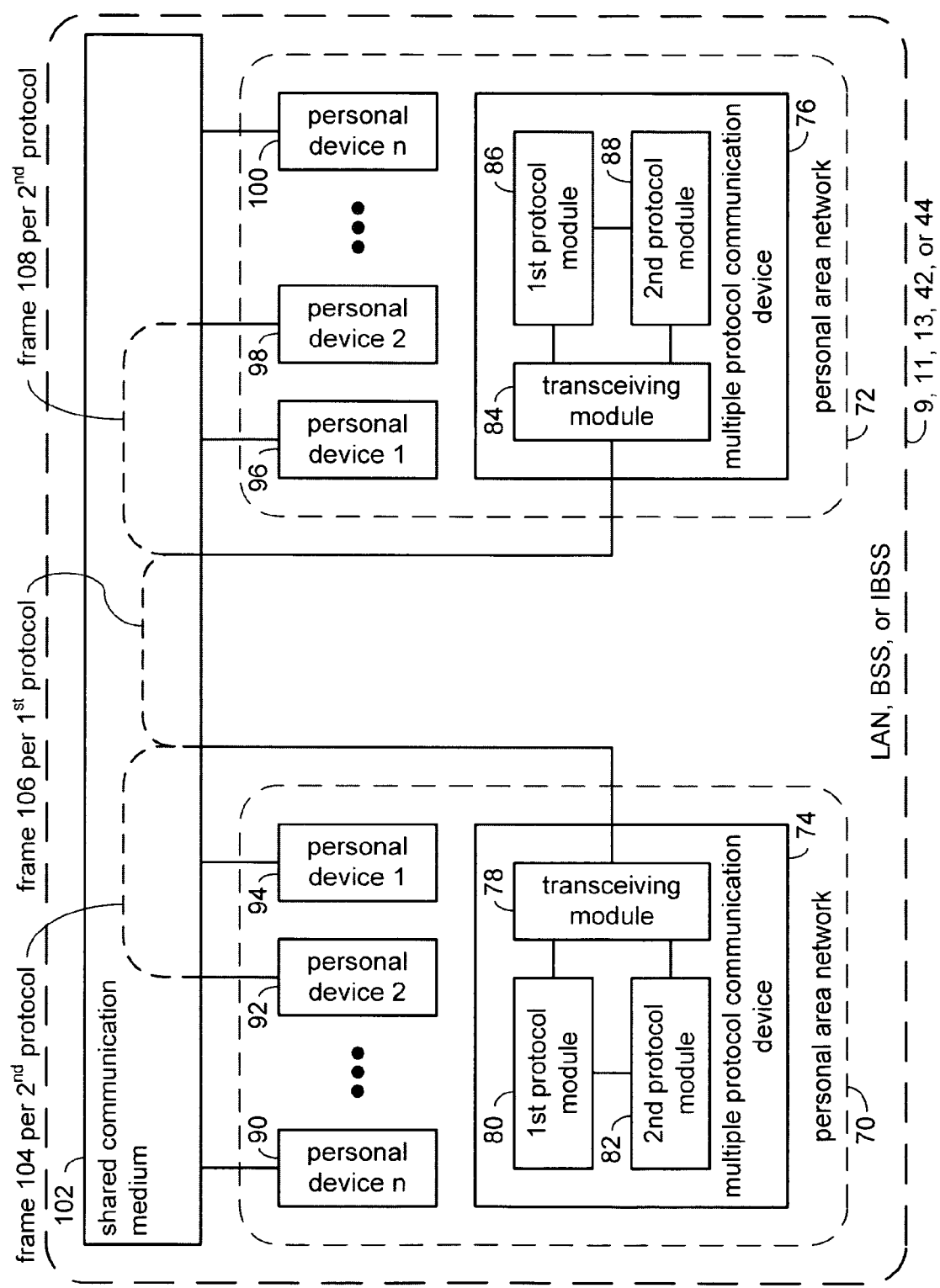
FIG. 3 is a schematic block diagram of a LAN, BSS, and/or IBSS in accordance with the present invention.

FIG. 3 is a schematic block diagram of an example of a LAN, BSS, and/or IBSS 9, 11, 13, 42, or 44 that includes personal area networks 70 and 72 and a shared communication medium 102. Each of the personal area networks 70 and 72 includes a multiple protocol communication device 74, 76 (which may be any one of the wireless communication devices 18-32 of FIG. 1 or the wireline communication devices 58-68 of FIG. 2) and a plurality of personal devices 90-94 and 96-100. The personal devices 90-100 may be any peripheral device affiliated with the communication device 72, 74 including, but not limited to, a headset, a keyboard, a mouse, a printer, a monitor, a fax machine, a scanner, a digital camera, a digital camcorder, a digital audio playback device, or a video playback device. The shared communication medium 102 may be a shared twisted pair connection, a shared optical connection, a shared coaxial connection, or a shared frequency spectrum.

Each of the multiple protocol communication devices 74 and 76 includes a first protocol module 80, 86, a second protocol module 82, 88, and a transceiving module 78, 84. In one embodiment, the first protocol module 80, 86 is configured to support a first protocol that enables the communication device 74, 76 to communicate at a local area network level and/or wide area network level using the shared communication medium 102, while the second protocol module is configured to support a second protocol that enables the communication device 72, 74 to communicate with the personal devices 90-94, 96-100 within its personal area network 70, 72 using the shared communication medium 102. For instance, the first and second protocols may be one or more of a past, current, or future version of Ethernet, SONET, asynchronous transfer mode (ATM), frame relay, TCP/IP, advanced mobile phone services (AMPS), digital AMPS, global system for mobile communications (GSM), code division multiple access (CDMA), local multi-point distribution systems (LMDS), multi-channel-multi-point distribution systems (MMDS), Bluetooth, IEEE 802.11 (a), (b), (g), (n), any other wireline standard or any other wireless standard.

The first and second protocol modules 80, 82, 84, 86 may be implemented using a processing module and associated memory. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. In general, the memory stores, and the processing module executes, operational instructions corresponding to at least some of the steps and/or functions illustrated in FIGS. 3-9E. In addition, the memory may store data produced by the processing module.

The transceiving modules 78, 84 may be a wireless transceiver and/or a wireline transceiver. In one embodiment, a wireline transceiver is a network card or multiple network cards that enable the communication device 74, 76 to communicate within the LAN and outside of the LAN and also to communicate with the personal devices 90-94, 96-100. In another embodiment, a wireless transceiver enables the communication device 74, 76 to wirelessly communicate within the LAN and outside of the LAN and also to communicate with the personal devices 90-94, 96-100.

In operation, when a multiple protocol communication device 74, 76 desires to communicate with one of the personal devices 90-94 or 96-100, the first protocol module 80, 86 generates a frame, or segment thereof, 106 in accordance with the first protocol and includes an indication of the duration for which the device 74, 76 desires to use the shared communication medium 102. The device 74, 76 transmits the frame 106 to other devices in the system, to an access point, to a base station, to a server, etc. The other devices will process the frame 106 in accordance with the first protocol and, upon proper interpretation, will not use the shared communication medium 102 for the time period indicated in the frame 106.

After transmitting the frame 106, the first protocol module 80, 86 hands-off access of the shared communication medium 102 to the second protocol module 82, 88. For the duration of access to the shared communication medium 102, or a portion thereof, the second protocol module 82, 88 conveys data, audio, video, and/or text information with one or more personal devices 90-94, 96-100 in frames 104, 108 via the shared communication medium 102 and in accordance with the second protocol. Since the other communication devices in the system know that the shared communication medium 102 is being accessed, they will not attempt to access the shared communication medium 102 until it becomes available, again, according to the time period indicated in the frame 106, thus avoiding collisions from other devices while a different protocol is accessing the shared communication medium 102.

Figure 4:
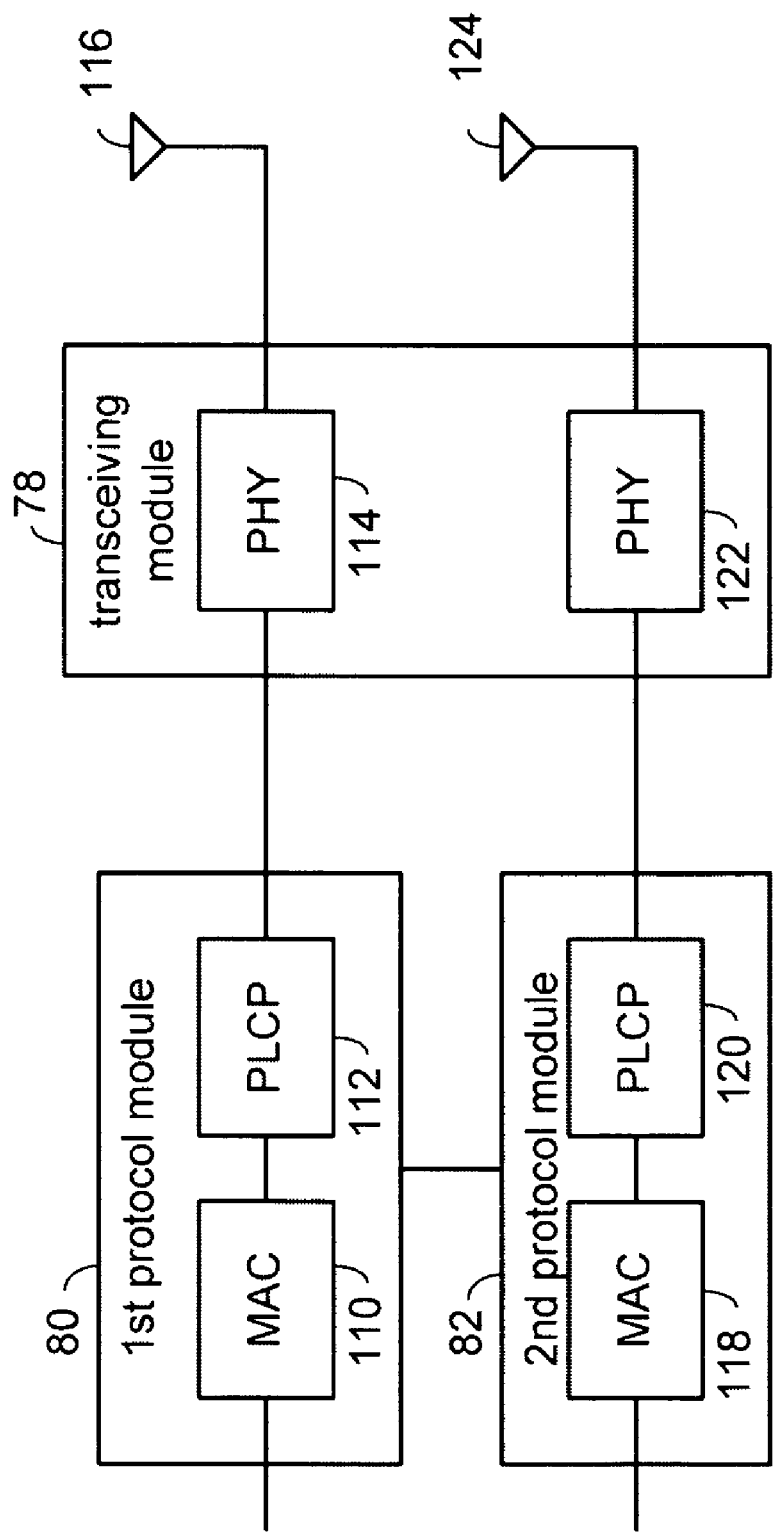
FIG. 4 is a schematic block diagram of a wireless communication device in accordance with the present invention.

FIG. 4 is a schematic block diagram of a wireless communication device 74 that includes the first protocol module 80, the second protocol module 82, the transceiving module 78, and antenna structures 116 and 124. Each of the antenna structures 116 and 124 may be a single antenna or an array of antennas. The first protocol module 80 includes a Medium Access Control (MAC) module 110 in accordance with a first protocol (e.g., a version of IEEE 802.11) and a Physical Layer Convergence Procedure (PLCP) module 112 in accordance with the first protocol. The second protocol module 82 includes a MAC module 118 in accordance with the second protocol (e.g., a version of Bluetooth) and a PLCP module 120.

The transceiving module 78 includes a first physical layer (PHY) module 114 coupled to the first protocol module 80 and a second PHY module 122 coupled to the second protocol module 82. Each of the PHY modules 114 and 122 includes a transmit section and a receive section coupled to the corresponding antenna structure 116, 124 such that each PHY module 114, 122 converts outbound baseband data into outbound RF signals and converts inbound RF signals into inbound baseband signals. As one of ordinary skill in the art will appreciate, the PHY modules 114 and 122 may share at least a portion of the antenna structures 116 or 124 and may share common components such as the low noise amplifier, power amplifier, RF bandpass filters, direct conversion mixers, etc.

In operation, when a multiple protocol communication device 74 desires to communicate with one of its personal devices 90-94, the MAC module 110 generates a frame, or segment thereof, 106 in accordance with the first protocol (e.g., a version of the IEEE 802.11 standard) and includes an indication of the duration for which the device 74 desires to use the shared communication medium 102. The MAC module 110 provides the frame 106 to the PLCP module 112, which in turn provides the frame 106 to the PHY module 114 for RF transmission to other devices in the system, to an access point, to a base station, to a server, etc. The other devices will process the frame 106 in accordance with the first protocol and, upon proper interpretation, will not use the shared communication medium 102 for the time period indicated in the frame 106. Note that the MAC and PLCP are higher layer protocols than the PHY layer protocols.

In addition, the MAC module 110 communicates with the MAC module 118 to indicate the duration for which the MAC module 118 will have access to the shared network. The MAC module 110 also hands-off control of the shared communication medium to the MAC module 118 for transmitting and/or receiving communications in accordance with the second protocol.

The communication device 74 may further function to block downstream transmissions (i.e., transmissions to the communication device) from devices utilizing the second protocol (e.g., IEEE 802.11 compliant communications) when the communication device 74 is receiving or transmitting a communication utilizing the first protocol (e.g., Bluetooth communications). In this embodiment, the first protocol module 80 and/or the second protocol module 82 detects a potential collision between the first and second communications (e.g., a Bluetooth device is communicating or will likely be communicating on the shared communication resource and a communication from an access point is expected by the communication device). When a potential collision is detected, the first and/or second protocol module generates a blocking indication to block transmission of at least a portion of one of the first and second communications to substantially avoid a collision between the first and second communications. The first and/or second protocol module provides the blocking indication to the transceiving module 78 for transmission within the first RF signals or within the second RF signals.

FIG. 5 is a logic diagram of a method for coordinating multiple protocols using a shared communication medium that begins at step 130 where the first protocol module determines that the second protocol module desires access to the shared communication medium, wherein the second protocol module operates in accordance with a second protocol. The determination may be made in a plurality of ways including, but not limited to, receiving a communication from the second protocol module indicating the desire to access the shared communication medium; determining, on a periodic basis, that the second protocol module desires access based on an application supported by the second protocol module (e.g. the second protocol module is supporting a headset function polling); receiving from another protocol module that the second protocol module desires access to the shared communication medium (e.g., from a higher layer which knows that a particular program (e.g., a voice program) is active and access is needed); and determining, on a random basis, that the second protocol module desires access to the shared communication medium (e.g., polling).

The process then proceeds to step 132 where the first protocol module transmits at least a segment of a frame to other devices in the system. The frame, or portion thereof, which is in accordance with a first protocol, includes an indication of a duration that the shared communication medium will be accessed. This will be described in greater detail with reference to FIGS. 6-9E.

The process then proceeds to step 134 where the first protocol module hands-off access of the shared communication medium to the second protocol module for at least a portion of the duration that the shared communication medium will be accessed such that the second protocol module has access to the shared communication medium with negligible interference from devices of the first protocol. This will be described in greater detail with reference to FIGS. 6-9E.

FIGS. 6-8 are logic diagrams of various embodiments of transmitting a frame, or portion thereof, and handing-off access of the shared communication medium of the method of FIG. 5. In FIG. 6, the processing begins at step 132-1 where the first protocol module generates generating a preamble in accordance with the first protocol. For example, if the first protocol corresponds to IEEE 802.11(b), the first protocol module generates the preamble to include a short training sequence and a long training sequence. The process then proceeds to step 132-2 where the first protocol module generates a header in accordance with the first protocol to include a frame length indication, wherein the frame length indication includes length of a data section of the frame. Continuing with the IEEE 802.11(b) example, the header includes a signal field and a service field, either of which may contain a frame length indication.

The process then proceeds to step 132-3 where the first protocol module transmits the preamble and the header as the at least the segment of the frame to the transceiving module, which, in turn, converts the frame into an RF signal that is sent to other communication devices in the system. With the other devices in the system knowing that the shared communication medium will be accessed for the duration corresponding to the frame length they will not attempt to access it. Thereby avoiding inter-protocol interference (i.e., the devices operable in accordance with first protocol will not access the shared communication medium while a device operable in accordance with the second protocol is accessing the share communication medium.)

The process then proceeds to step 134-1 where the first protocol module indicates to the second protocol module that the shared communication medium is accessible for the duration corresponding to the length of the data section of the frame. This may be accomplished by providing a message, or a signal, from the first protocol module to the second protocol module directly or through a baseband processing module.

FIG. 7 includes processing that begins at step 132-4 where the first protocol module transmits a preamble, a header, and a request-to-send as the at least the segment of the frame to an access point in accordance with the first protocol, which is done via the transceiving module. The processing then proceeds to step 132-5 where the first protocol module receives a second preamble, a second header, and a clear-to-send from the access point in accordance with the first protocol. The request-to-send and/or the clear-to-send include a network allocation vector that identifies the duration that the shared communication medium will be accessed following the successful exchange of the request-to-send and/or clear-to-send frames and hence, an indication of the duration of the opportunity for medium sharing between the first protocol module and the second protocol module.

The process then proceeds to step 132-6 where the first protocol module transmits a third preamble and a third header, wherein the third header includes length of a data section of the frame that corresponds to the available opportunity for medium sharing of the duration allocated to the second protocol module, which is conveyed to the system via the transceiving module. The process then proceeds to step 134-2 where the first protocol module indicates to the second protocol module that the shared communication medium is accessible for the duration corresponding to the length of the data section of the third frame, or a portion thereof.

FIG. 8 includes processing that begins at step 132-7 where the first protocol module receives a preamble, a header, and a contention-free-poll from an access point in accordance with the first protocol. The contention-free-poll includes a network allocation vector that identifies the maximum duration that the shared communication medium is allowed to be accessed by the receiving node which is addressed in the contention-free-poll frame and hence, an indication of the duration of the opportunity for medium sharing between the first protocol module and the second protocol module. The processing then continues at step 132-8 where the first protocol module transmits a second preamble and a second header, wherein the second header includes length of a data section of the frame that corresponds to the available opportunity for medium sharing of the duration allocated to the second protocol module, which is relayed to the access point via the transceiving module. The processing then proceeds to step 134-3 where the first protocol module indicates to the second protocol module that the shared communication medium is accessible for the duration corresponding to the length of the data section of the frame, or a portion thereof.

FIGS. 9A-9F are diagrams of various examples of coordinating multiple wireless protocols using a shared communication medium via a fake PSDU and/or NAV-based indication. In general, the fake PSDU approach operates in a communication device that contains both an 802.11 LAN function and a Bluetooth master node function, or an 802.11 LAN function and the timing master of some other communication protocol function which is dissimilar to the 802.11 LAN function. The mechanism may also be applied to a case wherein the other protocol is also an 802.11 LAN function, such as when a more distant 802.11 LAN device desires access to the shared medium, but is generally unable to communicate with the other devices in the LAN because of, for example, distance limitations, but is able to communicate with the device containing the first 802.11 LAN function. To facilitate this approach, a communication channel exists between the 802.11 LAN function and the Bluetooth Master function within the common device. Such a communication channel may consist of a single signal which acts as a transmit/receive permission signal to the Bluetooth Master function. In one embodiment, the assertion of the signal indicates that the Bluetooth Master function is free to engage in transmit and receive activity according to the Bluetooth protocol. This is the Bluetooth permission channel.

In such an embodiment, the Bluetooth master node obeys the communication channel signaling strictly in order to create the desired coordination. In another embodiment, the 802.11 LAN function instructs the Bluetooth Master function to remain idle (i.e. refrain from transmit and receive activity) while the 802.11 LAN function is active. Accordingly, the 802.11 LAN function acts as the master of the Bluetooth function and will dictate the times when the Bluetooth function may become active.

When the 802.11 LAN function determines that a Bluetooth activity period should begin, the 802.11 LAN function gains control of the 802.11 LAN network (and therefore, the shared medium) and then secures uncontested access to the medium by sending an 802.11 preamble plus physical layer PLCP header which indicates that it is about to transmit a physical layer service data unit (PSDU). However, the PLCP indication is an intentional misdirection to the other 802.11 devices operating in the vicinity. Instead of sending a PSDU, the 802.11 LAN function immediately after sending the PLCP header information, passes control of the shared medium to the Bluetooth Master function through the Bluetooth permission channel. The Bluetooth Master function, through a prior frequency and duration requirements agreement, uses the medium for transmissions and receptions, directing other Bluetooth devices to transmit and receive according to the previously described frequency and duration agreements. (The PLCP header information contains encoded length information which signals to the other 802.11 LAN devices that a PSDU is to be received, and those devices then remain in a receive mode for the duration of time indicated by that length information, regardless of whether an actual PSDU is sent or not.) The length information transmitted in the "fake PSDU" corresponds to the desired Bluetooth activity duration.

At the end of the agreed upon duration of time which was granted to the Bluetooth Master function for the purpose of transmission and reception activity, the 802.11 LAN function de-asserts the Bluetooth permission signal, thereby disallowing any further Bluetooth function activity. As per the outstanding agreement, the Bluetooth Master function should have completed its current activity on the shared medium. Shortly after the removal of the Bluetooth permission signal, the end of the length of time as was indicated in the PLCP header should occur, allowing the normal 802.11 LAN medium access process to resume.

Because of the possible existence of hidden nodes, and as a measure to deal with the generally uncontrolled nature of the RF medium (especially when operating in unlicensed bands) and the resulting possible loss of the "fake PSDU"'s PLCP header information, the proxy TXOP mechanism supports additional optional transmissions which serve to offer redundant protection against 802.11 LAN use of the medium. Specifically, protective NAV values can be established around the "fake PSDU" transmission through additional, normal 802.11 LAN protocol mechanisms such as RTS/CTS.

The transmission of the "fake PSDU" does not require a preceding transmission or reception or succeeding transmission or reception, although such is not precluded. In general, the use of the "fake PSDU" allows a secondary LAN function to operate in a coordinated fashion with the primary, controlling LAN function.

In the NAV-based indication approach, function, or an 802.11 LAN function, the timing master of some other communication protocol function is dissimilar to the 802.11 LAN function. In this embodiment, a communication channel exists between the 802.11 LAN function and the Bluetooth Master function within the common device.

When the 802.11 LAN function determines that a Bluetooth activity period should begin, the 802.11 LAN function gains control of the 802.11 LAN network (and therefore, the shared medium) and then secures uncontested access to the medium by sending frames that are intended to cause a Network Allocation Vector (NAV) to become set in the other participating LAN devices. However, the NAV indication is an intentional misdirection to the other 802.11 devices operating in the vicinity. Instead of using the allocated time for additional 802.11 LAN frame exchanges, as would naturally be assumed by the other 802.11 LAN devices which received the NAV-setting frames, the 802.11 LAN function instead passes control of the shared medium to the Bluetooth Master function through the Bluetooth permission channel.

The Bluetooth Master function, through a prior frequency and duration requirements agreement, uses the medium for transmissions and receptions, directing other Bluetooth devices to transmit and receive according to the previously described frequency and duration agreements. The NAV duration information transmitted in the earlier 802.11 LAN messages corresponds to the desired Bluetooth activity duration. At the end of the agreed upon duration of time which was granted to the Bluetooth Master function for the purpose of transmission and reception activity, the 802.11 LAN function de-asserts the Bluetooth permission signal, thereby disallowing any further Bluetooth function activity. As per the outstanding agreement, the Bluetooth function should have completed its current activity on the shared medium.

Shortly after the removal of the Bluetooth permission signal, the end of the length of time as was indicated in the NAV duration information should occur, allowing the normal 802.11 LAN medium access process to resume. It is possible that the NAV duration information exceeds the allotment of time required by the Bluetooth Master function—this may be intentionally done in order to allow the device's 802.11 LAN function to perform 802.11 activity within the same shared medium access period. It is also possible that the original NAV setting operation was preceded by other of this device's 802.11 activity, and that following the original NAV setting operation, but preceding any Bluetooth activity, this device's 802.11 LAN function engaged in 802.11 activity.

The transmission of the NAV information does not require a preceding transmission or reception or succeeding transmission or reception, although it may include such transmission or reception. In general, the use of some of the time which has been secured by the 802.11 LAN function through the NAV mechanism is to be used by the secondary LAN function to operate in a coordinated fashion with the primary, controlling LAN function. Best practices suggest the use of preceding transmissions and/or receptions in order to provide further/redundant guarantees that the other devices of the same type as the controlling LAN function have temporarily ceased their attempts to use the shared medium.

FIG. 9A is a diagram of a frame 140 generated by the first protocol module, which in this example, is compliant with a version of IEEE 802.11. The frame 140 includes a preamble 142, a header 144, and a fake PDSU 146. The preamble 142 and header 144 are implemented in accordance with a version of IEEE 802.11 and the header 144 includes a frame length indication. The fake PDSU 148 corresponds to the data field of a normal IEEE 802.11 compliant frame. However, in this instance, the data field is empty, meaning that the transmitter sends no energy during this period of time, and access permission to the shared communication resource is asserted 150 such that the second protocol module may transmit and/or receive communications 148 via the shared resource. When the frame 140 ends, the first protocol module de-asserts 152 the second protocol module's permission to access the shared medium.

FIG. 9B is a diagram of a frame 160 generated by the first protocol module, which in this example, is compliant with a version of IEEE 802.11. The frame 160 includes a preamble 162, a header 164, and a request to send (RTS) field 166. In the RTS field portion of frame 160, a RTS duration 168 is provided to other devices within the communication system. In response to frame 160, the first protocol module 160 receives a preamble 170, a header 172, and a clear to send (CTS) field 174. The header 172 and/or within the CTS field 174 include a CTS duration 178.

In response to the CTS field 174, the first protocol module generates another preamble 178 and another header field 180. In this embodiment, the header field 180 includes a PLP length 182, which is allocated to the second protocol module for second protocol transmissions 188 via assertion of permission 184 and a subsequent de-assertion of permission 186. In this example, the shared communication medium is still allocated to the first protocol module after de-assertion of access to the second protocol module such that the first protocol module may transmit 190 because the time allocated to the second protocol module and indicated in the PLCP length 182 was less than the time indicated in the CTS field 174.

FIG. 9C is similar to FIG. 9B, with the exception that the entire duration of access to the shared communication medium as indicated in the CTS field 174 is granted to the second protocol module.

Figure 9D:
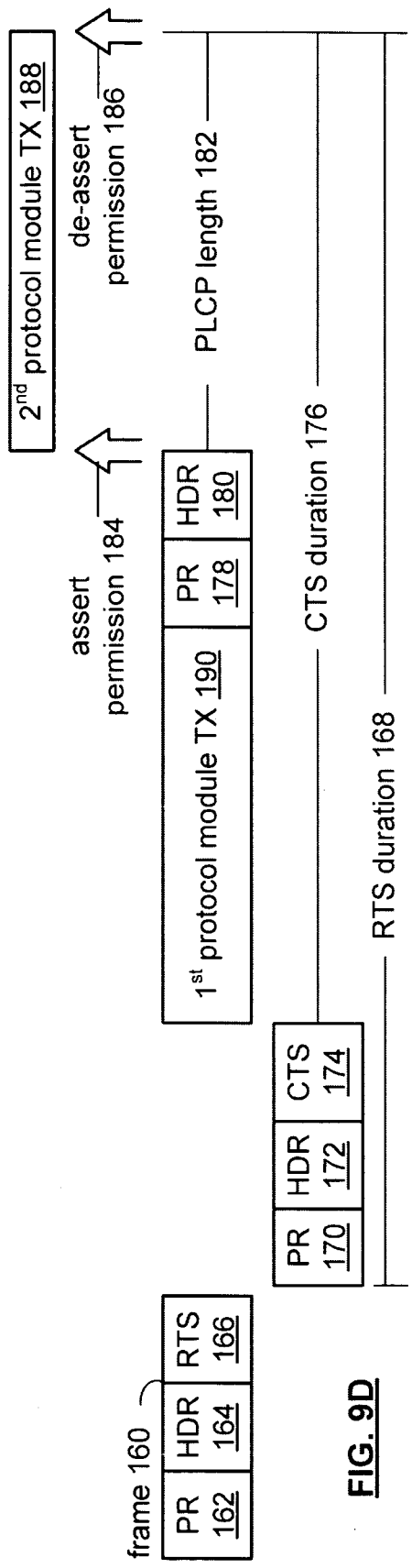
Figure 9E:
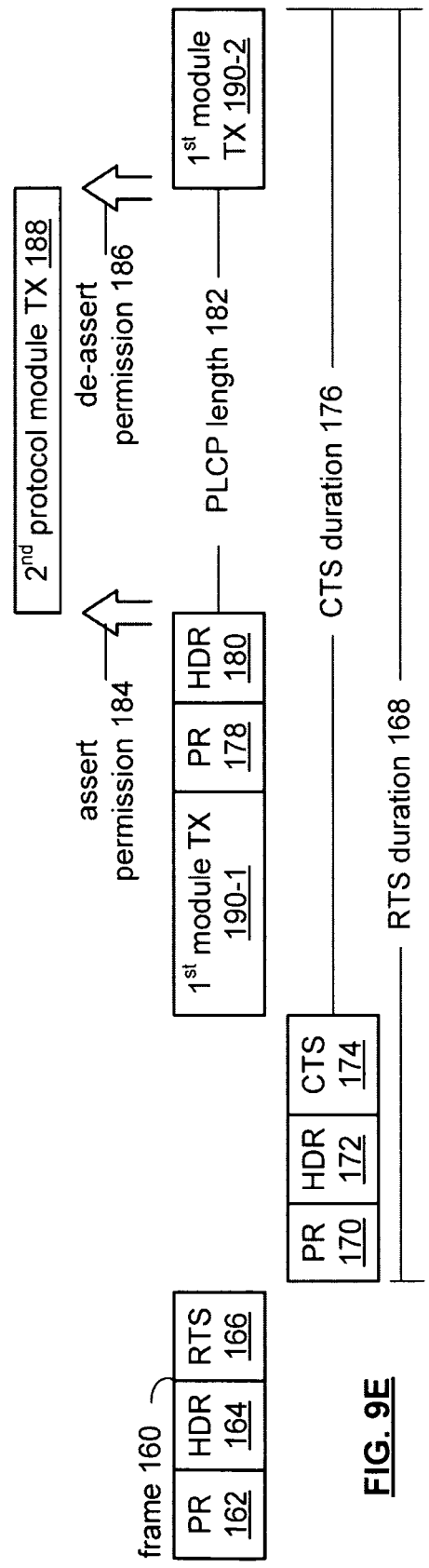

FIGS. 9D and 9E illustrate variations to the allocation of access to the shared communication medium. In FIG. 9D, the first protocol module has access to the shared communication medium prior to access being passed to the second protocol module. In FIG. 9E, the $1^{st}$ protocol transmission 190 of FIG. 9D is split into two parts 190-1 and 190-2.

Figure 9F:
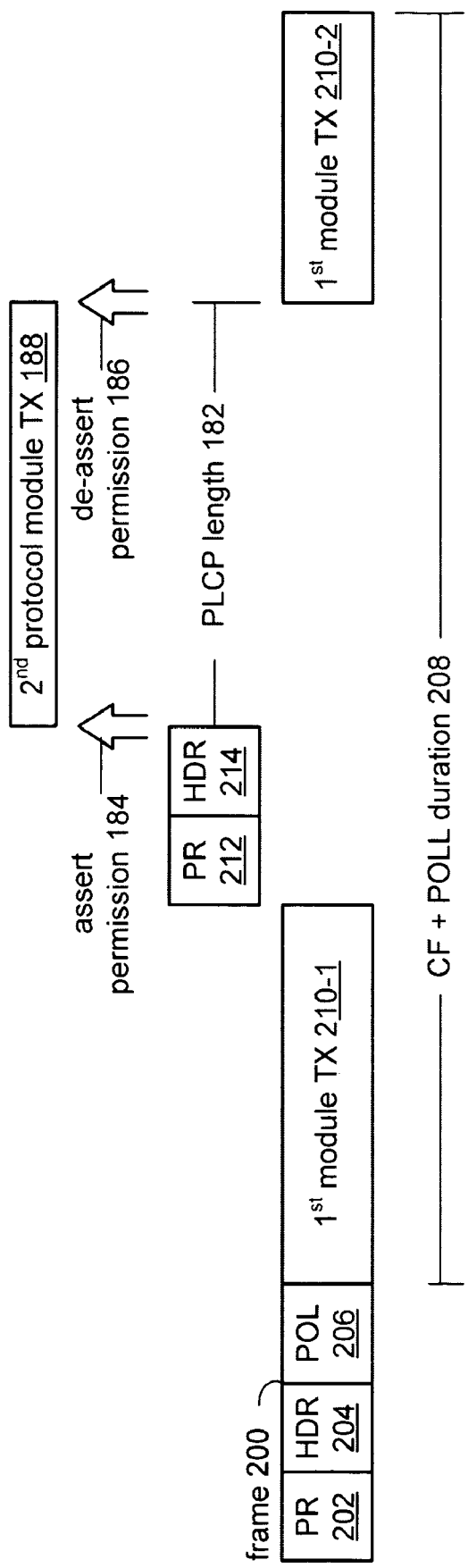

FIG. 9F illustrates another frame 200 that includes a preamble 202, a header 204, and a poll field 206. This field may be constructed in accordance with a version of IEEE 802.11 and include an indication of a CF (contention free)+Poll duration 208, which provides an indication of a maximum allowed opportunity for shared medium use on the part of the recipient. In this embodiment, the first protocol module of another transmitter which may or may not contain a second protocol function may transmit 210-1 followed by the transmission of another preamble 212 and a header 214 by the device which contains the first and second protocol functions. The header 214 indicates a PLCP length 182, during which access to the shared communication medium is provided to the second protocol module for transmissions 188. After the PLCP length 182 has ended, the first protocol module of the first transmitter may transmit 210-2 which may occur before the completion of the CF+POLL duration 208 time, provided that the recipient of the 210-1 has not employed all of the possible time allotted for transmissions by either the first or second protocol.

Figure 10:
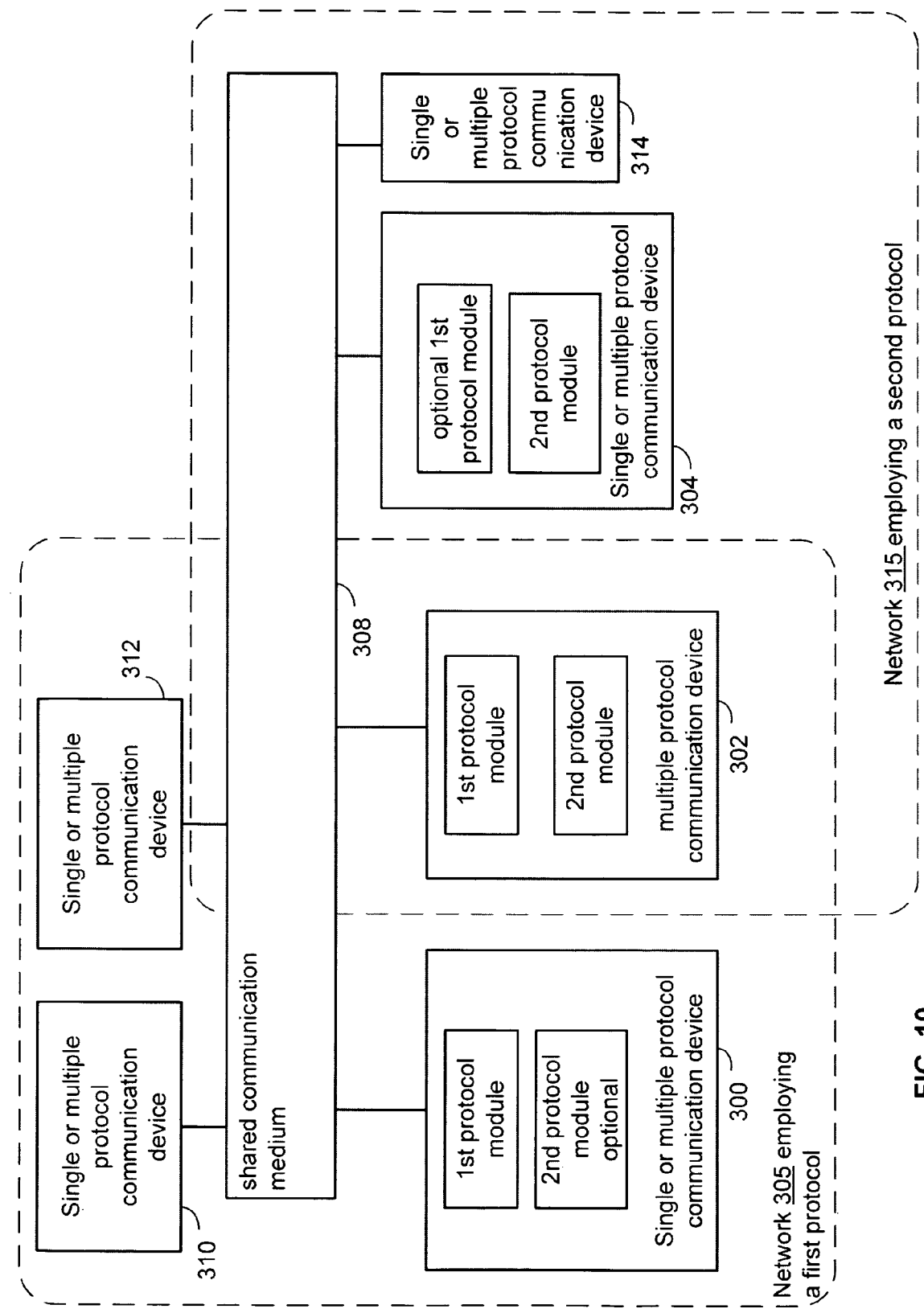
FIG. 10 is a schematic block diagram of another LAN, BSS, and/or IBSS in accordance with the present invention.

FIG. 10 is a schematic block diagram of an example of a LAN, BSS, and/or IBSS 9, 11, 13, 42, or 44 that includes a first network 305 that utilizes a first protocol (e.g., Bluetooth, IEEE 802.11a, b, g, n, etc.) and a second network 315 that utilizes a second protocol (e.g., Bluetooth, IEEE 802.11a, b, g, n, etc.). The first network 305 includes and includes devices 300, 302, 310 and 312 and the second network includes devices 302, 304 and 314. In this example, device 302 is a multiple protocol device (i.e., includes a first protocol module and a second protocol module). Devices 300, 310, and 312 include the first protocol module and may optionally include the second protocol module. Similarly, devices 304 and 314 include the second protocol module and may optionally include the first protocol module. Note that devices 310, 212, 304, and 314 need not be present, but are merely depicted to demonstrate versatility of multiple protocol multiple network communications. In this example, the two networks 305 and 315 share a communication medium 308. The shared communication medium 308 may be a shared twisted pair connection, a shared optical connection, a shared coaxial connection, or a shared frequency spectrum.

In this example, device 300 determines through examination of the upper layer headers of a packet which has been given to it for transmission to device 302 on network 305, that the second protocol module of device 302 desires access to network 315. At the time when the identified packet is to be transmitted by device 300 using the first protocol, device 300 employs for example, any of the mechanisms from FIG. 11 or 9A-9F to create an opportunity on the shared medium for device 302 to send and receive packets using the second protocol.

Device 300, in examining the packet for transmission, must have knowledge from a previous agreement with device 302 that 1) packets containing certain upper layer header information and which are intended for delivery using the first protocol to device 302 will subsequently be forwarded by device 302 using the second protocol 2) that whenever device 300 actually transmits one of the packets so identified using the first protocol, that device 302 will, upon reception, perform the delivery of that packet using the second protocol, and as such, device 302 will require a reservation of time on the shared medium through the use of any of several mechanisms available to the first protocol such as described in FIG. 11 or 9A-9F such that whenever device 300 transmits one of the packets identified using the first protocol, that a specific amount of time, or specific lower bound on the amount of time is required by device 302 for the transmission of packets using the second protocol, and as such, device 300 will be able to determine how much time to reserve on the shared medium for those transmissions.

To facilitate the above, an agreement between device 300 and 302 is created to confirm their relationship. Such agreement can be made, for example through any of the following means: 1) through exchange of information within an association and or authentication process whereby device 302 registers to use the network employing the first protocol with device 300—an example of such would be the presence of information with an element structure contained within an association request frame sent by device 302 to device 300 and the response to the reception of that information which is sent by device 300 to device 302 in an element structure contained within an association response frame, where said information constitutes the consummation of said agreement 2) an exchange as described in the previous means, but with the roles of association requestor and granter reversed 3) through exchange of information within any other set of frames, such as management frames which are not part of the association or authentication process 4) through some other means which does not employ frame exchange, such as through manually entering information at each device, for example, through a user or administrator manually entering device 302 registration information at device 300, and through a user or administrator manually enabling the agreement at device 302, through, for example, a selection made through a menu which enables device 302 to connect with and utilize the shared medium through communication employing the first protocol.

In this example, the registration provides enough information to allow device 300 to determine which upper layer information it needs to identify (for example, internet protocol (IP) header source and destination address information, port numbers and protocol identifier information) in order to determine that a packet for transmission to device 302 and employing the first protocol will require the inclusion of the proper signaling within the first protocol (for example, setting a NAV) to allow the receiving device 302 to be able to use, immediately subsequent to the reception of the packet using the first protocol, the shared medium employing the second protocol for the forwarding and exchange of packets using the second protocol. Packets not containing the appropriate upper layer information will not cause device 300 to create the signaling within the first protocol to accommodate the forwarding and exchange of packets by device 302 using the second protocol, and device 302 will, upon reception of such packets, determine that no such accommodation has been made. The registration also provides information to allow device 300 to determine how much time to reserve on the shared medium for the possible transmissions by device 302.

When such agreement exists, has been enabled, and committed to, devices 300 and 302 both then interpret that the transmission by device 300 of a frame matching the criteria for subsequent forwarding on the part of device 302, implies the presence of a period of time which has been created with the mechanisms contained within the first protocol, to allow the subsequent forwarding of the frame.

An alternative embodiment includes additional signaling, either within the frame sent from device 300 to device 302 and employing the first protocol as for example, a bit field which indicates that device 302 has been granted use of the shared medium, or within an explicit signaling frame employing the first protocol and subsequent to the transmission of the frame which was used to determine that a sharing of the medium was required, which is an explicit indication that the medium sharing shall be performed. In the case of an explicit mechanism such as is described here, then no registration of an agreement is necessary, although one may be used to confirm that the device being granted the time for transmission employing the second protocol is capable of interpreting the explicit medium sharing permission information and that the device being granted the time for transmission employing the second protocol desires the use of the shared medium for further packet forwarding purposes. (In some instances, the packet may not require further forwarding.)

Figure 11:
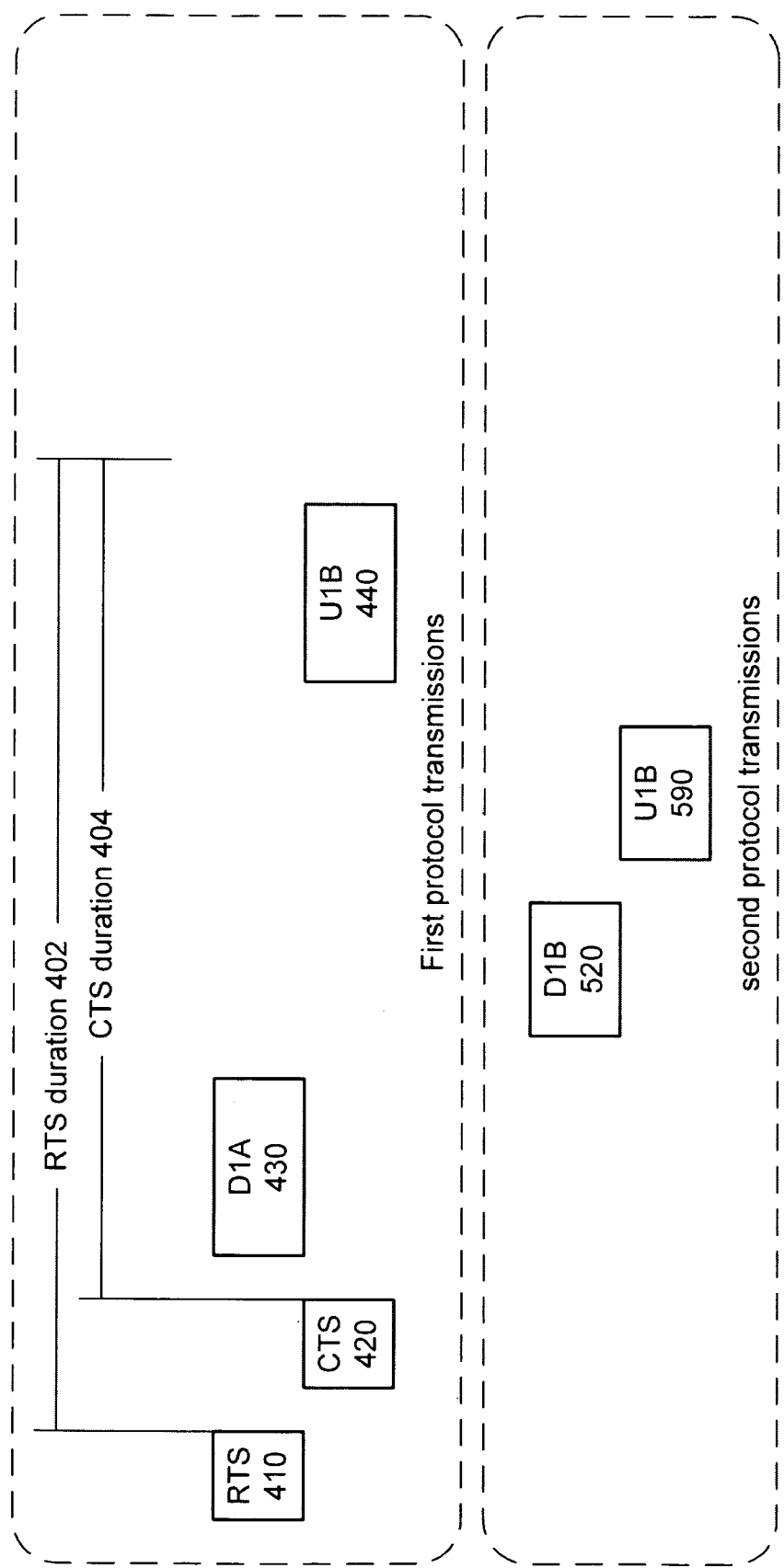
FIG. 11 is a diagram of an example of coordinating a multiple protocol multiple network communication in accordance with the present invention.

FIG. 11 illustrates a transmission of an RTS 410 by device 300 (from FIG. 10) employing the first protocol which is followed by a transmission of a CTS 420 by device 302 employing the first protocol. The transmission of the RTS 410 is initiated by device 300 when it determines that device 302 will require use of the shared medium, for example, through having examined the packet 430 contents and established that the contents of packet 430 will subsequently require retransmission by device 302 on the shared medium using the second protocol as packet 520. The RTS 410 includes an air time reservation intended to reserve the medium for a long enough period of time to allow for: a) the transmission of the CTS packet 420 by device 302 using the first protocol b) the transmission of packet 430 by device 300 using the first protocol, c) the subsequent retransmission of packet 430 as packet 520 by device 302 on the shared medium using the second protocol, d) transmission of a packet 590 by device 304 using the second protocol, e) and a retransmission of the second protocol transmission of packet 590 as packet 440 by device 302 using the first protocol. The packets 430, 520, 590 and 440 would typically represent, for example, a voice packet from the voice network being sent toward a handset using the first protocol, the retransmission of voice packet 430 from the handset to the headset using the second protocol, the transmission of a voice packet from the headset to the handset using the second protocol, and the retransmission of voice packet 520 from the handset toward the voice network, respectively.

In other example scenarios, it is possible that the forwarding of the packet 430 elicits no further exchange, such that packets 590 and 440 do not appear. In general, the agreement of the relationship between device 300 and device 302 which establishes the desire of device 302 to employ some portion of the shared medium time for the exchange of packets using the second protocol may include an explicit indication of how much time should be shared per packet 430 which is delivered from device 300. The exact utilization of that shared medium time is left to device 302, and may include an exchange of packets different from the one shown in FIG. 11, so long as the total time employed is as per the time in the agreement. In another embodiment, the agreement between device 300 and 302 specifies a lower value for the time allocation to be granted to the exchange of packets employing the second protocol, and the device 300, through the explicit reservation made by, for example, the duration value from the RTS frame, shall indicate to device 302 the exact amount of time being allocated for use by the second protocol packet exchange on a dynamic basis.

Following the examples of FIGS. 9A-9F, modifications to the reservation of the shared medium through first protocol means may be substituted for the RTS/CTS exchange as shown in FIG. 11. These alternative schemes include but are not limited to, employing a CTS-to-self transmission in place of the RTS/CTS exchange, relying on the duration information. (airtime reservation information) from within packet 430, and employing PHY header length information to reserve the medium time.

Figure 12:
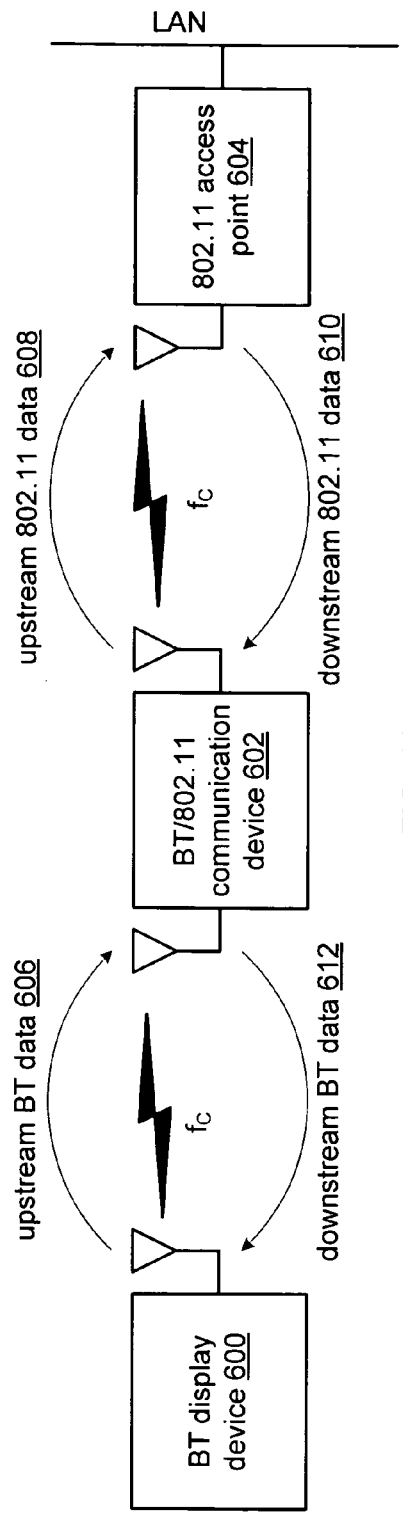
FIG. 12 is a schematic block diagram of a multiple protocol communication in accordance with the present invention.

FIG. 12 is a schematic block diagram of a multiple protocol communication between a Bluetooth (BT) display device 600 (e.g., a headset, a digital video player, a digital audio player, digital camera, digital video recorder, etc.) a Bluetooth/IEEE802.11 wireless communication device 602 (e.g., at least one of devices 18-30 of FIG. 1), and, an IEEE 802.11 access point 604 (e.g., device 12 and/or 16 of FIG. 1). In this example, the data communicated between devices 600-604 is real-time data such as a digital voice, digital audio playback and/or record, digital video playback and/or record, etc. Thus, to the user of the BT display device 600, upstream and downstream data should be continuous. While this example is being presented using real-time data, the example applies equally well to non real-time data.

Continuing with the example, the BT display device 600 transmits upstream BT data 606, which includes one or more packets formatted in accordance with at least one version of the Bluetooth standard. The BT/802.11 communication device 602 converts the upstream BT data 606 into upstream 802.11 data 608, which includes one or more packets formatted in accordance with at least one version of the IEEE 802.11 standard (e.g., IEEE 802.11g). The 802.11 access point 604 provides the upstream 802.11 data 608 to a local area network (LAN), which may be coupled to a server, a wide area network (WAN) router, a public telephone network, and/or other real-time based device.

The 802.11 access point 604 provides downstream 802.11 data 610 from the LAN to the BT/802.11 communication device 602. The downstream 802.11 data 610 may be voice data from one or more parties participating in a telephone call with the user of the BT display device 600, may be digital audio data, and/or may be digital video data. The BT/802.11 communication device 602 converts the downstream 802.11 data 610 into downstream BT data 612, which is subsequently transmitted to the BT display device 600.

As is further shown, the shared communication medium has the same carrier frequency band ($f_C$) for the Bluetooth communications and the 802.11 communications. As such, avoiding overlapping Bluetooth communications with 802.11 communications (i.e., collisions) is an important aspect in providing reliable and efficient wireless LAN services.

Figure 13:
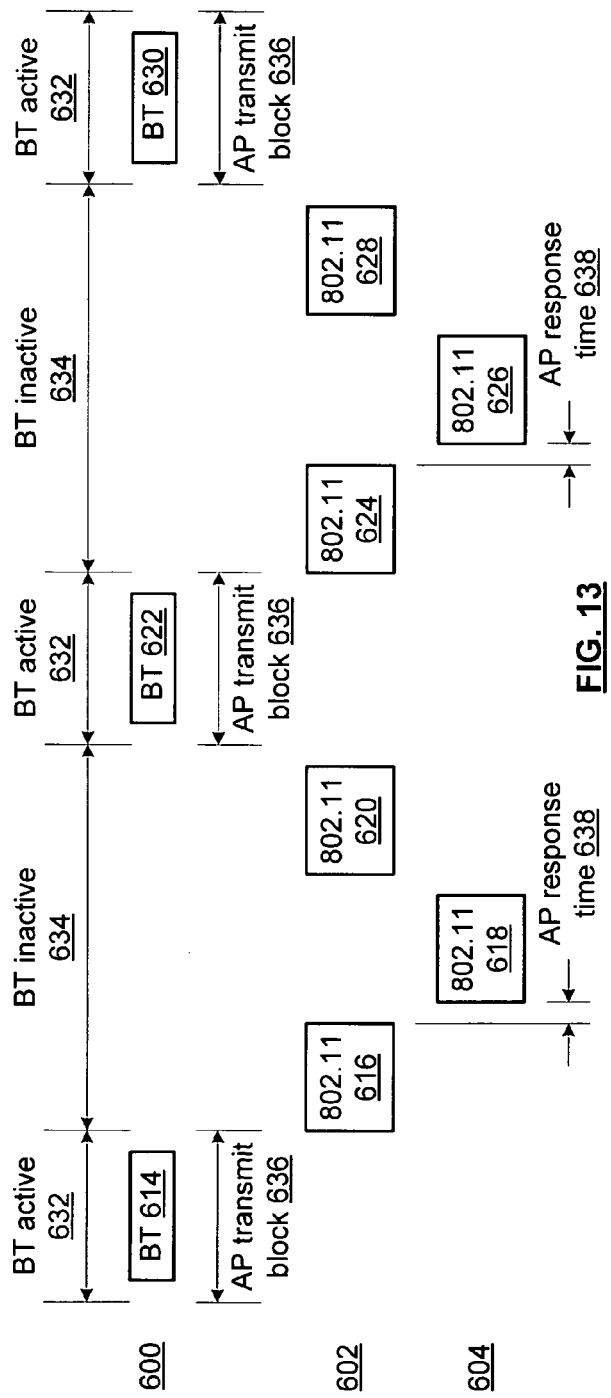
FIG. 13 is a packet diagram of the communication illustrated in FIG. 12.

FIG. 13 is a packet diagram that demonstrates collision avoidance for the communication illustrated in FIG. 12. In this example, the shared wireless communication medium may be reserved for the BT communications using any of the mechanisms previously discussed. For each BT packet communicated, the BT/802.11 communication device 602 determines the time that the BT packet communication is active (i.e., active time period 632) and the time between BT packet communications (i.e., inactive time period 634). The BT/802.11 communication device 602 utilizes the active time period for a plurality of BT packet communications to determine a probable BT active time period. Such a determination may be done by using a probability density function. In addition, BT/802.11 communication device 602 utilizes the inactive time period between a plurality of BT packet communications to determine a probable BT inactive time period. Such a determination may also be done by using a probability density function.

The BT/802.11 communication device 602 utilizes the probable BT active and/or inactive time periods to determine when to block 636 transmissions from the 802.11 access point 604 to itself. To further facilitate the determination when to block 636 transmissions form the 802.11 access point, the BT/802.11 communication device may monitor the access point's response time 638 to requests to transmit, to receive a clear to send, polling response, etc. In this manner, the communication device 602 coordinates the transmission to and from the access point 604 and to and from the BT display device 600 such that minimal collisions occur between the BT device transmitting the upstream BT data 606 and the access point 604 transmitting the downstream 802.11 data 610. Note that once the shared wireless communication resource is in use, the communication device 602 utilizes standardized techniques to avoid collisions, however, when the shared wireless communication resource appears to be available, the communication device 602 can utilize the probable BT active time period 632, the probable BT inactive time period 634, and/or the AP response time 638 to coordinate the upstream BT data 606 and the downstream 802.11 data 610.

Figure 14:
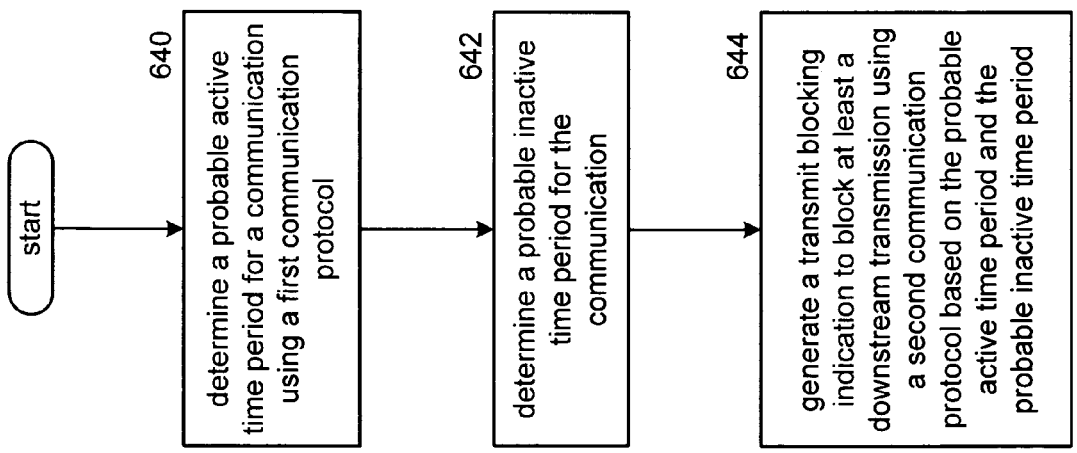
FIG. 14 is a logic diagram of a method for collision avoidance in multiple protocol networks using a shared communication medium in accordance with the present invention.

FIG. 14 is a logic diagram of a method for collision avoidance in multiple protocol networks using a shared communication medium. The method begins at step 640 where the communication device determines a first protocol probable active time period for a communication using a first communication protocol (e.g., Bluetooth). The method then proceeds to step 642 where the communication device determines a first protocol probable inactive time period for the communication using the first communication protocol. The method then proceeds to step 644 where the communication device generates a transmit blocking indication to block at least a downstream transmission using a second communication protocol (e.g., IEEE 802.11) based on the first protocol probable active time period and the first protocol probable inactive time period. Note that the first and second communication protocols use the shared communication medium.

In an embodiment, the communication device may determine the first protocol probable active time period by detecting commencement of transmitting a packet of the communication using the first communication protocol. The commencement of transmitting the packet may be detected by a MAC or higher layer signaling that indicates an upcoming transmission and/or by an over-the-air detection. Once the commencement of transmitting the packet is detected, the communication device then enables a timer. The communication device then detects end of the packet of the communication using the first communication protocol. The communication device then stores the value of the timer upon the detecting the end to produce a measured active time period. The communication device may do this for a plurality of packets of the communication using the first communication protocol to produce a plurality of measured active time periods. The communication device then may perform a probability function upon the plurality of measured active time periods to obtain the first protocol probable active time period.

In an embodiment, the communication device may determine the first protocol probable inactive time period by detecting end of the packet of the communication using the first communication protocol. The communication device then resets the timer to an initial value (e.g., 0). The communication device then enables the timer. The communication device then detects commencement of transmitting the packet of the communication using the first communication protocol. The communication device then stores the value of the timer upon the detecting the activation to produce a measured inactive time period. The communication device may do this for a plurality of packets of the communication using the first communication protocol to produce a plurality of measured inactive time periods. The communication device then performs a probability function upon the plurality of measured inactive time periods to obtain the first protocol probable inactive time period.

In an embodiment, the communication device may generate the transmit blocking indication by setting a power management subfield to a power savings mode (e.g., 1) for a time frame corresponding to the first protocol probable active time period. The communication device then sets the power management subfield to a normal power mode for a time frame corresponding to the first protocol probable inactive time period. The communication device may further determine a downstream transmission response time of the access point. The communication device may then adjust the time at which the setting of the power management subfield occurs based on the downstream transmission response time.

In an embodiment, the communication device may generate the transmit blocking indication by setting a power management subfield to a power savings mode. The communication device then may send a request for the downstream transmission during the first protocol probable inactive time period. The communication device may further determine a downstream transmission response time of the access point. The communication device may then adjust the time of the sending of the request for the downstream transmission based on the downstream transmission response time.

In an embodiment, the communication device may generate the transmit blocking indication by generating a clear-to-send-to-self message based on at least one of the first protocol probable active time period and the first protocol probable inactive time period or by a Power Savings+Poll message based on at least one of the first protocol probable active time period and the first protocol probable inactive time period.

As a particular example, a standardized WLAN MAC engine may be modified to include a free running incrementing timer Timer1 and logic. The timer is used as follows:

when a BT RF_ACTIVE signal (e.g., a BT packet is to be transmitted) is asserted the value of Timer1 is copied to register T1 and the timer is reset to 0;

when the BT RF_ACTIVE signal is deasserted the value of Timer1 is copied to register T2. The logic asserts an interrupt signal to the WLAN main processor when the BT RF_ACTIVE signal state changes.

In addition, a WLAN driver software may be modified as follows:

include two lists L1 and L2 such that each element of list L1 corresponds to a particular value of register T1 and each element of list L2 corresponds to a particular value of register T2.

A software function responsive to BT RF_ACTIVE state change interrupt:
    Read the value of BT RF_ACTIVE signal;
        If RF_ACTIVE signal is asserted increment the value of the element of list L1 corresponding to the value of register T1;
        If RF_ACTIVE signal is deasserted increment the value of the element of list L2 corresponding to the value of register T2;

A software function executed periodically:
    Analyze the contents of list L1 to determine probability density function of T1;
        Based on T1 PDF estimation determine the value E1 corresponding to certain probability of T1 being larger than E1;
    Analyze the contents of list L2 to determine probability density function of T2;
        Based on T2 PDF estimation determine the value E2 corresponding to certain probability of T2 being smaller than E2;

The WLAN MAC engine may be further modified for BT coexistence logic enhancement as follows:

a register E1 specifying the time from the previous assertion of BT RF_ACTIVE signal to the next one; The value of E1 is updated whenever BT RF_ACTIVE signal is asserted.

a register E2 specifying the time BT RF_ACTIVE signal will stay asserted. The value of E1 is updated whenever BT RF_ACTIVE signal is deasserted.

a decrementing timer Timer2, such that:
    When BT RF_ACTIVE signal is asserted the value of register E1 is copied to Timer2;
    Timer2 stops when it reaches 0;
change to 802.11 frame transmission logic such that the transmission of the frame is blocked if the Duration field of the 802.11 frame is greater than the value of Timer2;
logic to stop AP from transmitting to STA:
    If WLAN is in BSS mode
        if the value of Timer2 is less than some register F1
            if there is an 802.11 frame pending to be transmitted
                set the power management subfield of this frame to 1;
            else
                send 802.11 management frame with power management subfield of this frame to 1;
    When BT RF_ACTIVE signal is deasserted send power savings (PS)-Poll frame (e.g., change power savings state and request downstream transmission via polling);
    if WLAN is in IBSSS mode
    if the value of Timer2 is less than some register F2
        send CTS-to-Self 802.11 frame with Duration field set to the value in register E2.

In an example embodiment, the communication device always indicates PM=1, which means that the device is always operating as a power-managed device. Further, transmission of a frame with PM=1 occurs at least once in the association, or at some time subsequent to association and transmission of additional frames with a PM=1 indication prior to each BT activity time is not necessary. However, whenever a frame is transmitted, it will indicate PM=1, and sometimes, such transmissions may occur prior to a BT activity time, but such transmissions are not necessary to the invention in this embodiment. As such, frames only get transmitted toward the device when the device explicitly requests the frames, which may be done by the transmission of either a PS-Poll frame or a "trigger frame" if using IEEE 802.11 U-APSD or Wireless Fidelity Alliance (WFA) U-APSD which is a derivative of the IEEE 802.11 U-APSD mechanism.

In either case, the returned frame(s) might occur at any time (i.e. it typically does not immediately follow the PS-Poll transmission or trigger frame transmission, even though it is permitted to do so), including the time when the next BT transmission occurs. The AP receives the "request" frame and then may need time to retrieve the buffered packet, then queue it and then get access to the network to send it. In an example embodiment, the communication device switches in and out of power management mode, by sending PM=1 before the BT activity and PM=0 after the BT activity.

Figure 15:
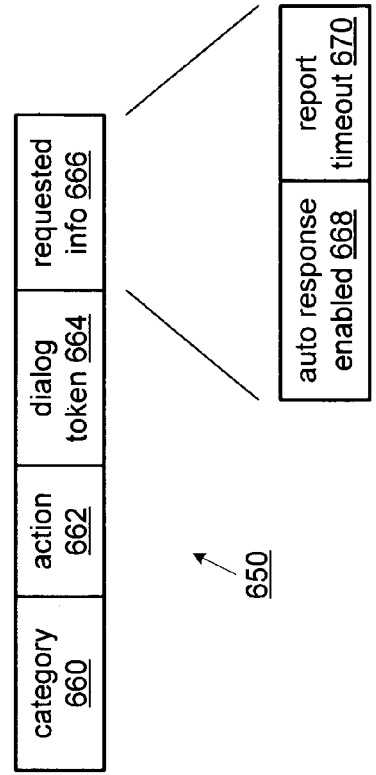
FIG. 15 is a schematic block diagram of an access point obtaining co-location interference information from a multiple protocol device in accordance with the present invention.

FIG. 15 is a schematic block diagram of an access point 604 obtaining co-location interference information from a multiple protocol device 602. In this embodiment, the access point 604 transmits an interference request 650 to the multiple protocol device 604, which may be a Bluetooth-IEEE 802.11 communication device. In response to the interference request 650, which be described in greater detail below, the multiple protocol device 604 generates an interference response 652 and provides it to the access point 604. In this manner, the access point 604 can control when the requests are transmitted and, to some extent, when the responses are transmitted. In addition to, or in the alternative of, the access point 604 may provide an interference information enable signal to the multiple protocol device 602 such that the multiple protocol device 602 provides the co-location interference information when it changes. Further, the access point 604 may indicate within the interference information enable signal that, even if the multiple protocol device 602 has an update to report, it does not provide the updated information any more often than a predetermined time period (e.g., 1 second).

Having acquired the interference information from one or more multiple protocol devices, the access point 604 may use the information to avoid collisions of its transmissions with communications compliant to another standard (e.g., Bluetooth, GSM, EDGE, GPRS, CDMA, etc.). For example, if the interfering signal using a frequency hopping scheme, the access point and/or the multiple protocol device(s) may use the known frequency hopping pattern to know when to avoid certain frequencies and for how long. Note that since the multiple protocol device 602 knows what its multiple protocols are, determining pertinent interference information is a relatively simple process.

As another example, by knowing the periodicity of an interferer, the access point 604 and/or the multiple protocol device 602 may increase its transmission rate such that its frame length may be reduced to avoid a collision with the interferer. This allows the access point 604 and/or the multiple protocol device to response to interference in non-typical fashions. For instance, a typical response to interference is to slow the data transmission rate down, but, in the presence of a periodic interferer, would make the collision worse due to the longer time of transmission.

As one of ordinary skill in the art will appreciate, by knowing the characteristics of an interferer, the access point 602 and/or the multiple protocol device 602 may work around the interferer to reduce the number of collisions, thereby improving the efficiency of both protocol communications.

Figure 16:
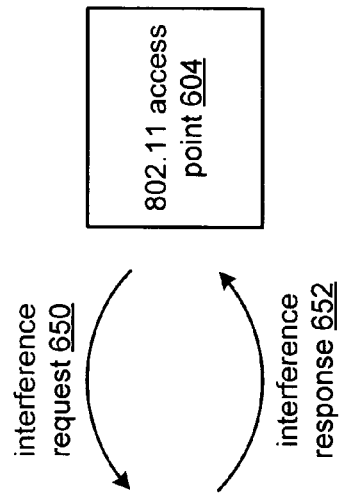
FIG. 16 is a diagram of an interference request in accordance with the present invention.

FIG. 16 is a diagram of an interference request 650 that includes a category field 660, an action field 662, a dialog token field 664, and a request information field 666. The request information field 666 may include an auto response enable field 668 and a report timeout field 670. Each of fields 660-666 may be 1 octet in length.

The access point 602 may enable auto response by setting the auto response enable field 668 to 1. In this mode, the station (e.g., the multiple protocol device) will automatically provide an interference report to the access point in accordance with information contained in the other fields 660-664. The information contained in the report may be specifically requested via the request time out field and/or one of the other fields. For example, the requested information may include one or more of interference level, interference level accuracy, interference interval, interference burst length, interference start time, interferer center frequency, interferer bandwidth, interferer modulation/spreading, and interferer symbol duration. Alternatively, a default interference report may be generated (e.g., have an interferer and its type). Note that the access point 604 may include a report limiting function to limit the rate of reports it receives such that the congesting on the network is controlled and saturating the network is avoided.

In one embodiment, the multiple protocol device may receive a co-location enable signal from the access point. The multiple protocol device may then determine whether co-location information feature is activated. This may be done by checking a register. The multiple protocol device then provides a null response to the access point when the co-location feature is not activated.

Figure 17:
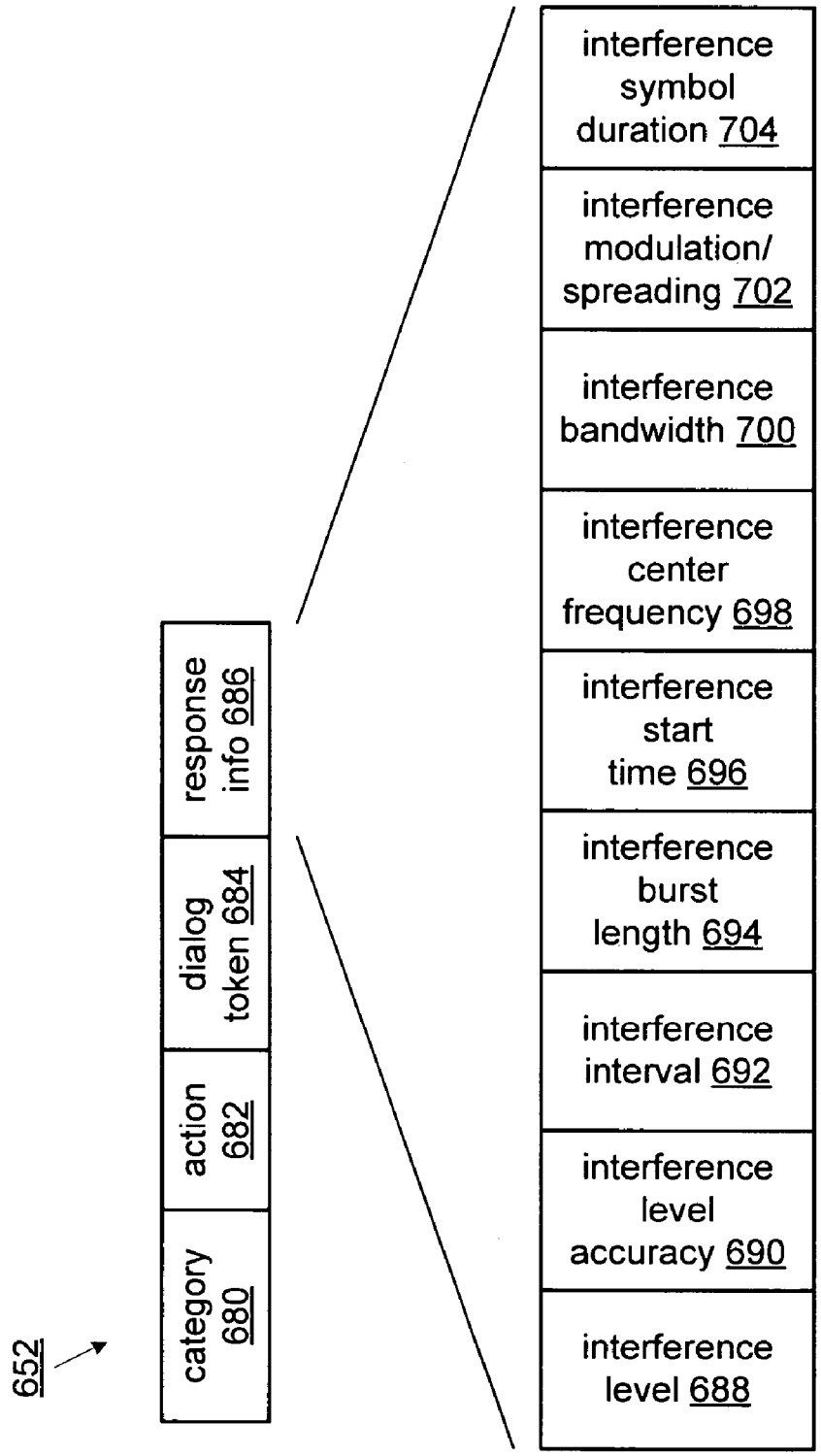
FIG. 17 is a diagram of an interference response in accordance with the present invention.

FIG. 17 is a diagram of an interference response 662 that includes a category field 680, an action field, a dialog token field 684, and a response information field 686. The response information field 686 may include an interference level 688, an interference level accuracy 690, an interference interval 692, an interference burst length 694, an interference start time 696, an interference center frequency 698, an interference bandwidth 700, an interference modulation/spreading information 702, and an interference symbol duration 704.

In one embodiment, the interference level 688 is a signed integer that indicates a maximum level of the expected interference, which may be in units of dBm averaged over a predetermined period of time (e.g., 4 microseconds) during an interference burst. The interference level accuracy 690 may be an unsigned integer that indicates the expected accuracy of the estimated interference in dB. For example, +/−3σ events are within δ dB. The interference interval 692 indicates the interval between two successive periods of interference, which may be measured in microseconds. One or more default values may be used to indicate continuous interference and/or unknown burst intervals. For example, a value of 65535 may be used to indicate continuous interference.

The interval burst length 694 indicates the duration of a period of the interference, which may be measured in microseconds. As with the interference interval 692, one or more default values may be used to indicate continuous interference and/or unknown burst intervals. For example, a value of 65535 may be used to indicate continuous interference. The interference start time 696 indicates a counter value as to when the next interference burst will begin. For example, the least significant 4 bytes of the TSF timer may be used to indicate the start of the next interference burst. Note that a default value (e.g., 65535) in this field indicates that no start time information is available.

The interferer center frequency 698 indicates an approximate center frequency in MHz of the interferer. If the center frequency of the interferer is not known or the interference covers a channel of the interferer, then the center frequency of the channel is used. The interferer bandwidth 700 indicates the approximate 3-dB bandwidth of the signal in KHz. If the bandwidth is unknown, a default value may be used (e.g., 65535).

The interferer modulation/spreading information 702 indicates the type of digital modulation and/or spreading used by the interferer. The interferer symbol duration 704 indicates the symbol duration in KHz. Recall that since the source of the interference is the other protocol module, the information regarding its channel usage, bandwidth, modulation and/or spreading scheme is known.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
   providing, by an access point, a request for co-location interference information to at least one multiple protocol device, the request including an auto response enable field to enable an automatic response from the at least one multiple protocol device in providing the co-location interference information to the access point and the request also including a report timeout field to limit a rate at which the co-location interference information is provided to the access point;
   obtaining, by the at least one multiple protocol device, co-location interference information in response to the request, the at least one multiple protocol device using a first communication protocol to communicate with the access point and a second communication protocol to communicate with another device;
   providing, by the at least one multiple protocol device, the co-location interference information to the access point pertaining to co-location interference between the first and second communication protocols; and
   using the co-location interference information to control operation of the access point to permit the access point to communicate with the at least one multiple protocol device using the first communication protocol at a different time than when the at least one multiple protocol device communicates with the another device using the second communication protocol, in order to reduce collisions between the first and second communication protocols.

2. The method of claim 1, wherein the co-location interference information comprises at least one of:
   interference level;
   interference level accuracy;
   interference interval;
   interference burst length;
   interference start time;
   interferer center frequency;
   interferer bandwidth;
   interferer modulation/spreading; and
   interferer symbol duration.

3. The method of claim 2 further comprises:
when information regarding the at least one of the co-location interference information is not obtainable, providing a default value.

4. The method of claim 1 further comprises:
determining, by the at least one multiple protocol device, whether the co-location information has changed;
when the co-location information has changed, updating, by the at least one multiple protocol device, the co-location information to produce updated co-location information; and
providing, by the at least one multiple protocol device, the updated co-location information to the access point automatically when enabled by the auto response enable field.

5. The method of claim 4, wherein the providing the updated co-location information to the access point comprises:
determining, by the at least one multiple protocol device, whether an update time period determined by the report timeout field has expired; and
when the update time period has not expired, waiting to provide the updated co-location information to the access point unit the update time period has expired.

6. The method of claim 1, wherein the first communication protocol is in accordance with a wireless local area network communication standard and the second communication protocol is in accordance with at least one of a cellular telephone communication standard, a data communication standard, and a Bluetooth wireless communication standard.

7. The method of claim 1 further comprises:
determining whether the auto response enable field is enabled; and
when the auto response enable field is not enabled, providing a null response to the access point.

8. A multiple protocol device comprises:
a transceiver for converting inbound radio frequency (RF) signals into inbound symbols and for converting outbound symbols into outbound RF signals; and
a protocol module coupled to:
obtain co-location interference information in response to a request from an access point, the request including an auto response enable field to enable an automatic response from the multiple protocol device in providing the co-location interference information to the access point and the request also including a report timeout field to limit a rate at which the co-location interference information is provided to the access point, and in which the multiple protocol device uses a first communication protocol to communicate with the access point and a second communication protocol to communicate with another device;
provide, in accordance with the auto response enable field, the co-location interference information to the access point via the transceiver pertaining to co-location interference between the first and second communication protocols; and
using the co-location interference information to control operation of the access point to permit the access point to communicate with the multiple protocol device using the first communication protocol at a different time than when the multiple protocol device communicates with the another device using the second communication protocol, in order to reduce collisions between the first and second communication protocols.

9. The multiple protocol device of claim 8, wherein the co-location interference information comprises at least one of:
interference level;
interference level accuracy;
interference interval;
interference burst length;
interference start time;
interferer center frequency;
interferer bandwidth;
interferer modulation/spreading; and
interferer symbol duration.

10. The multiple protocol device of claim 8, wherein the protocol module further functions to:
when information regarding the at least one of the co-location interference information is not obtainable, provide a default value.

11. The multiple protocol device of claim 8, wherein the protocol module further functions to:
determine whether the co-location information has changed;
when the co-location information has changed, update the co-location information to produce updated co-location information; and
provide, via the transceiver, the updated co-location information to the access point automatically when enabled by the auto response enable field.

12. The multiple protocol device of claim 11, wherein the protocol module further functions to provide the updated co-location information to the access point by:
determining whether an update time period determined by the report timeout field has expired;
when the update time period has not expired, waiting to provide the updated co-location information to the access point unit the update time period has expired.

13. The multiple protocol device of claim 8, wherein the protocol module further functions to:
determine whether the auto response enable field is enabled; and
when the auto response enable field is not enabled, provide a null response to the access point.

* * * * *

UNITED STATES PATENT AND TRADEMARK OFFICE
CERTIFICATE OF CORRECTION

PATENT NO. : 7,813,295 B2  
APPLICATION NO. : 11/651784  
DATED : October 12, 2010  
INVENTOR(S) : Jason A. Trachewsky Page 1 of 1

It is certified that error appears in the above-identified patent and that said Letters Patent is hereby corrected as shown below:

Title Page, Related U.S. Application Data:

Insert --(63) Continuation-in-part of application No. 11/545,743, filed on Oct. 10, 2006; continuation-in-part of application No. 11/075,981 filed on Mar. 9, 2005, now abandoned; Continuation-in-part of application No. 11/475,634 filed on Jun. 26, 2006, now abandoned.--

Title Page, Related U.S. Application Data, Section (60): Please replace this section with the following:

--(60) Provisional application No. 60/855,856, filed on Nov. 1, 2006; provisional application No. 60/694,948, filed on Jun. 29, 2005--

Signed and Sealed this
Fifth Day of June, 2012

David J. Kappos
*Director of the United States Patent and Trademark Office*